(12) United States Patent
Robertson et al.

(10) Patent No.: US 7,840,435 B2
(45) Date of Patent: Nov. 23, 2010

(54) EFFECTIVE SECURITY SCHEDULER

(75) Inventors: Craig Robertson, Denver, CO (US);
Ann Raechel Shrader-Brawley,
Houston, TX (US); Daniel G. Frisk,
Arlington, VA (US); **David R.
Pendergraft**, Manassas, VA (US)

(73) Assignee: Accenture Global Services GmbH,
Schafehausen (CH)

( * ) Notice: Subject to any disclaimer, the term of this patent is extended or adjusted under 35 U.S.C. 154(b) by 1822 days.

(21) Appl. No.: 10/400,441

(22) Filed: Mar. 28, 2003

(65) Prior Publication Data

US 2004/0193473 A1 Sep. 30, 2004

(51) Int. Cl.
*G06F 9/46* (2006.01)
(52) U.S. Cl. .......................................... 705/9
(58) Field of Classification Search ................ 705/9
See application file for complete search history.

(56) References Cited

U.S. PATENT DOCUMENTS

| | | | | |
|---|---|---|---|---|
| 5,185,780 A | * | 2/1993 | Leggett ................ | 379/265.08 |
| 5,289,368 A | * | 2/1994 | Jordan et al. ................ | 705/8 |
| 5,325,292 A | * | 6/1994 | Crockett ................ | 705/9 |
| 5,911,134 A | * | 6/1999 | Castonguay et al. ............ | 705/9 |
| 6,587,831 B1 | * | 7/2003 | O'Brien ................ | 705/8 |
| 6,823,315 B1 | * | 11/2004 | Bucci et al. ................ | 705/9 |
| 6,850,613 B2 | * | 2/2005 | McPartlan et al. ..... | 379/265.02 |
| 6,985,872 B2 | * | 1/2006 | Benbassat et al. ................ | 705/8 |
| 7,103,562 B2 | * | 9/2006 | Kosiba et al. ................ | 705/10 |
| 7,127,059 B2 | * | 10/2006 | Galvin ................ | 379/265.03 |
| 7,127,412 B2 | * | 10/2006 | Powell et al. ................ | 705/9 |
| 2002/0010615 A1 | * | 1/2002 | Jacobs ................ | 705/9 |
| 2002/0065700 A1 | * | 5/2002 | Powell et al. ................ | 705/9 |

OTHER PUBLICATIONS

Thompson, Gary M. "A Simulated-Annealing Heuristic for Shift Scheduling Using Non-Continuously Available Employees". 1996. Computers Ops Res. vol. 23, Issue 3. pp. 275-288.*

Kiran, Ali S.; Og, Serafettin. "Simulation Modeling and Analysis of a New International Terminal". 2000 Winter Simulation Conference.*

(Continued)

*Primary Examiner*—Johnna R Loftis
*Assistant Examiner*—Peter Choi
(74) *Attorney, Agent, or Firm*—Finnegan, Henderson, Farabow, Garrett & Dunner, LLP

(57) ABSTRACT

The present invention provides a system and process for creating an effective work schedule for a security checkpoint. The process includes the step of analyzing passenger flow to determine the coverage needed to sustain required service levels, generally through simulating the checkpoint to determine required staffing levels. Another step to optimize workforce levels and schedules is to create workforce schedules that are based on optimized person-hours and key variables. The schedule staffs as needed to achieve the required staffing levels and may consider numerous other factors, including acceptable ranges for shift lengths; a maximum number of start times; and a percentage of part-time or seasonal employees. In a particular embodiment, the schedule is formed by using linear programming to solve for a tour assignment matrix (defining a schedule) from a demand matrix representing the needed number of workers and a coefficient matrix representing the availability of workers.

38 Claims, 16 Drawing Sheets

OTHER PUBLICATIONS

Robertson, Craig V.; Shrader, Shelly; Pendergraft, David R.; Johnson, Lisa M.; Silbert, Kenneth S. "The Role of Modeling Demand in Process Re-Engineering". 2002 Winter Simulation Conference.*

Gatersleben, Michel R.; Van der Weij, Simon W. "Analysis and Simulation of Passenger Flows in an Airport Terminal". 1999 Winter Simulation Conference.*

Littler, R.A.; Whitaker, D.; "Estimating Staffing Requirements at an Airport Terminal". Feb. 1997. The Journal of the Operational Research Society. vol. 48, Issue 2. pp. 124-131.*

Snowdon, J.L.; MacNair, E.; Montevecchi, M.; Callery, C. A; El-Taji, S.; Miller, S. "IBM Journey Mangement Library: An Arena System for Airport Simulations". Apr. 2000. vol. 51, Issue 4. pp. 449-456.*

Kyle Jr., Robert G.; "Washington Dulles International Airport Passenger Conveyance Study". 1998 Winter Simulation Conference.*

Jim, Hee King; Chang, Zeph Yun. "An Airport Passenger Terminal Simulator: A Planning and Design Tool". 1998. Simulation Practice and Theory. vol. 6. pp. 387-396.*

Hafizogullari, Suna; Chinnusamy, Prathi; Tunasar, Cenk. "Simulation Reduces Airline Misconnections: A Case Study". 2002 Winter Simulation Conference.*

Leone, K. "Security System Throughput Modeling". 2002. Security Technology, 2002. Atlantic City: Transportation Security Administration—Aviation Securty Reearch and Development Division.*

L. Brunetta and G. Romanin-Jacur, "A flexible model for the evaluation of an airport terminal". 1999. In: G. Norton, D. Moller and U. Rude, Editors, ESS '99 Simulation in Industry SCS, Delft, Netherlands., pp. 224-226.*

L. Brunetta, L. Righi and G. Andreatta, "An operations research model for the evaluation of an airport terminal: SLAM (Simple Landside Aggregate Model)", 1999. Journal of Air Transport Management. vol. 5, Issue 3. pp. 161-175.*

Gatersleben, Michel R., van der Weij, Simon W., "Analysis and Simulation of Passenger Flows in an Airport Terminal". Dec. 5-8, 1999. Proceedings of the 31st Conference on Winter simulation: Simulation—a bridge to the future. Farrington, P.A., Nembhard, H. B., Sturrock, D. T., Evans, G. W., (eds.) pp. 1226-1231.*

Joustra, Paul E., Van Dijk, Nico M. "Simulation of Check-In at Airports". 2001. Proceedings of the 2001 Winter Simulation Conference, Peters B.A., Smiths J. S., Madeiros D.J, and Rohrer M. V., (eds.) pp. 1023-1028.*

Leone, Kelly. "Security System Throughput Modeling". 2002. Proceedings of the 36th Annual 2002 International Carnahan Conference on Security Technology. Oct. 20, 2002. pp. 144-150.*

Snowdon, Jane L.; El-Taji, Soad; Montevecchi, Mario; MacNair, Edward; Callery, C. Adam; Miller, Scott. "Avoiding the Blues for Airline Travelers". Dec. 13-16, 1998. Proceedings of the 30th Conference on Winter Simulation. pp. 1105-1112.*

Snowdon, Jane L.; El-Taji, Soad; Montevecchi, Mario; MacNair, Edward; Callery, C. Adam; Miller, Scott. "IBM Journey Management Library: An Arena System for Airport Simulations". Apr. 2000. The Journal of the Operational Research Society. vol. 51, No. 4. pp. 449-456.*

Littler, R. A.,; Whitaker, D.; "Estimating Staffing Requirements at an Airport Terminal". Feb. 1997. The Journal of the Operational Research Society. vol. 48, No. 2. pp. 124-131.*

Odoni, Amedeo R.; Bowman, Jeremy; Delahaye, Daniel; Deyst, John J.; Feron, Eric; Hansman, R. John; Khan, Kashif; Kuchar, James K.; Pujet, Nicolas; Simpson, Robert W. "Existing and Required Modeling Capabilities for Evaluating ATM Systems and Concepts". Mar. 1997. International Center for Air Transportation. Massachusetts Institute of Technology.*

Odoni, Amedo R.; de Neufville, Richard. "Passenger Terminal Design". 1992. Transportation Research 26A. No. 1. pp. 27-35.*

Aena. "Positioning Paper on Airport Simulation & Modelling Issues". Jan. 17, 2002. THENA.*

Verbraeck, Alexander; Dahanayake, Ajantha. "Building Blocks for Effective Telematics Application Development and Evaluation". 2002. Delft University of Technology, Faculty of Technology, Policy and management.*

A. Verbraeck, E. Valentin. "Simulation Building Blocks for Airport Terminal Modeling". In: E. Yücesan, C.-H. Chen, J.L. Snowdon and J.M. Charnes (Eds.). Proceedings of the 2002 Winter Simulation Conference, San Diego, Dec. 8-11, 2002. IEEE, Los Alamitos, CA. pp. 1199-1206.*

Valentin, Edwin; Verbraeck, Alexander.; "Guidelines for Designing Simulation Building Blocks". 2002. In: E. Yücesan, C.-H. Chen, J.L. Snowdon and J.M. Charnes (Eds.). Proceedings of the 2002 Winter Simulation Conference, San Diego, Dec. 8-11, 2002. IEEE, Los Alamitos, CA. pp. 563-571.*

Van Landeghem, H.; Beuselinck, A.; "Reducing Passenger Boarding Time in Airplanes: A Simulation Based Approach". 2002. European Journal of Operational Research. pp. 294-308.*

* cited by examiner

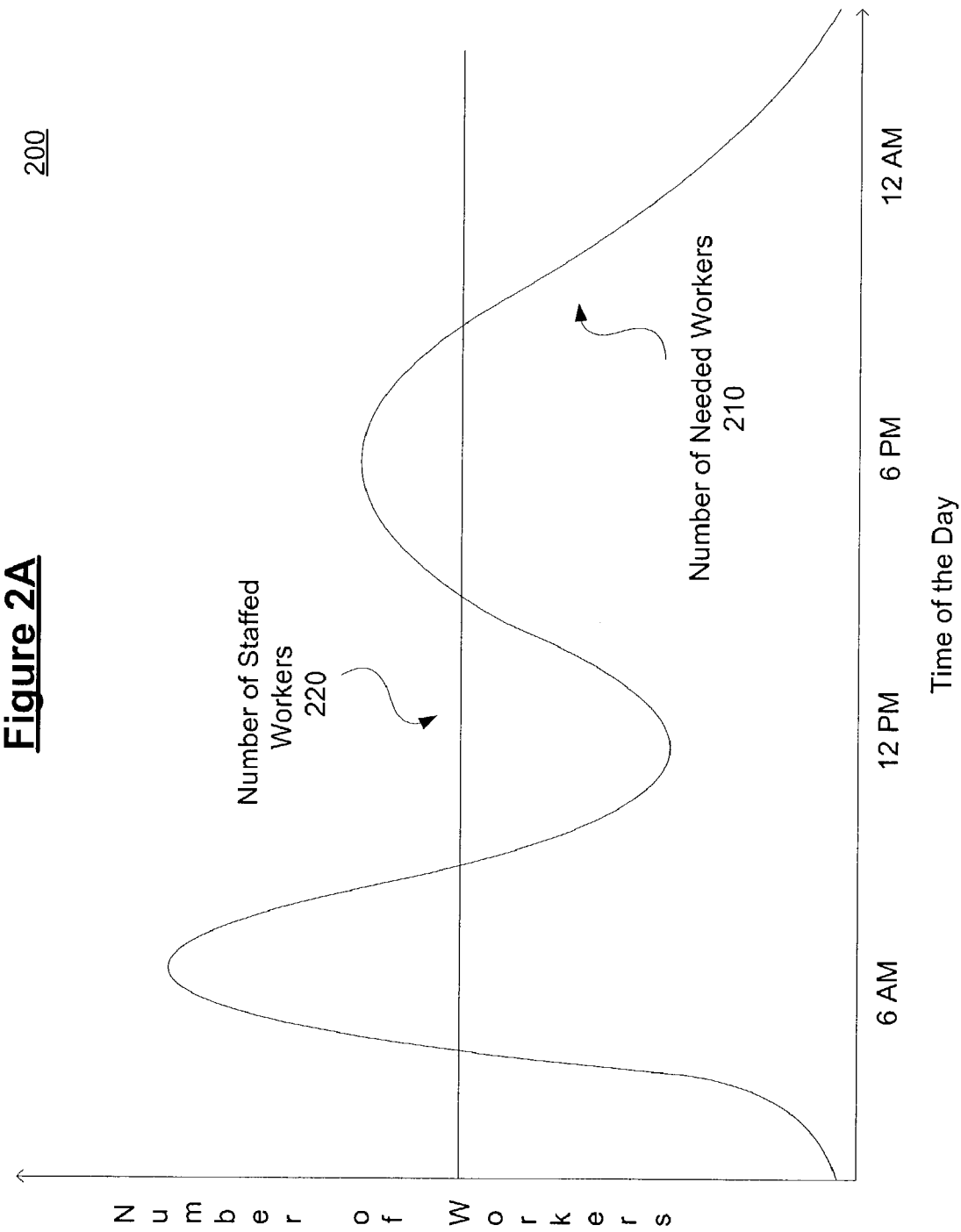

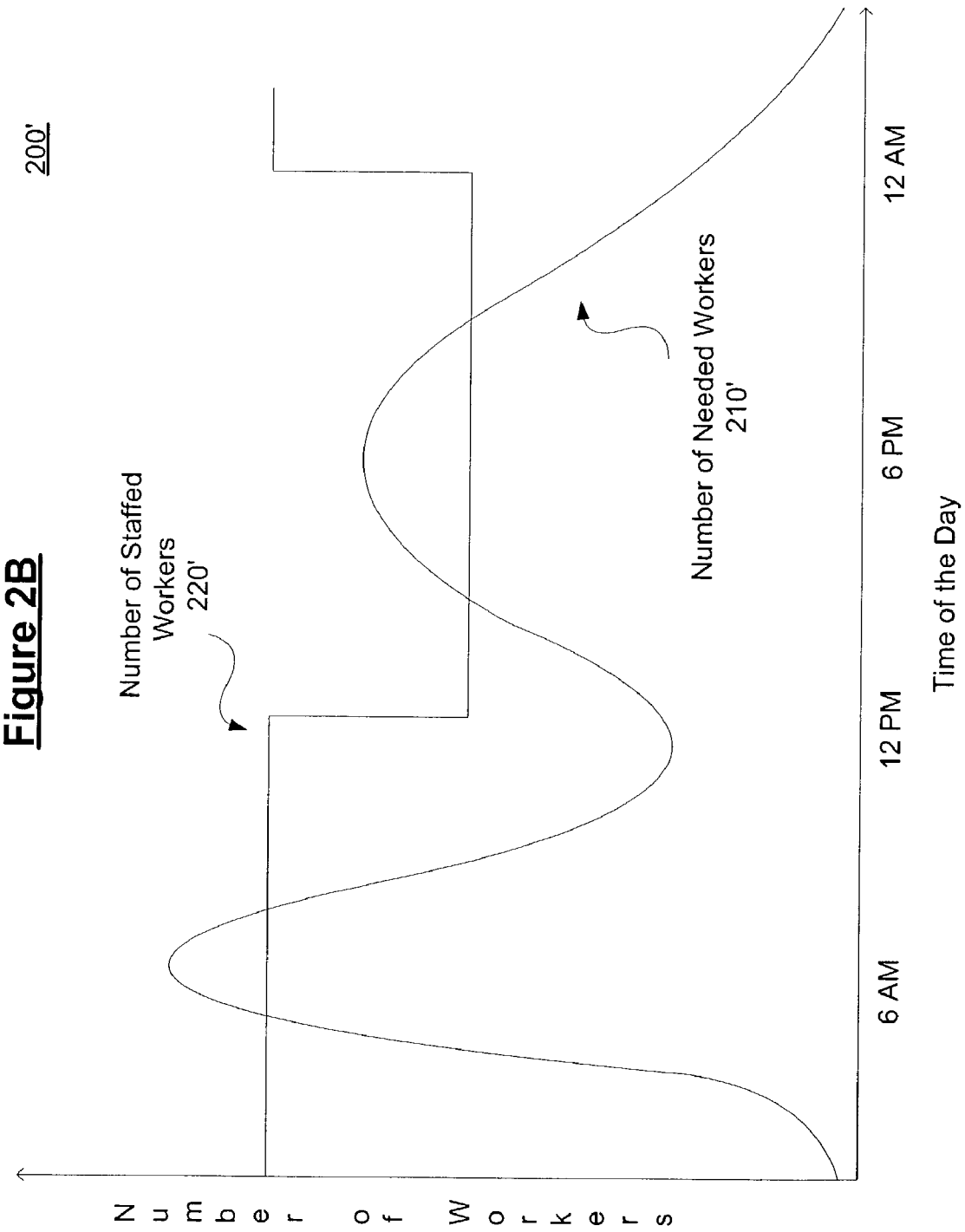

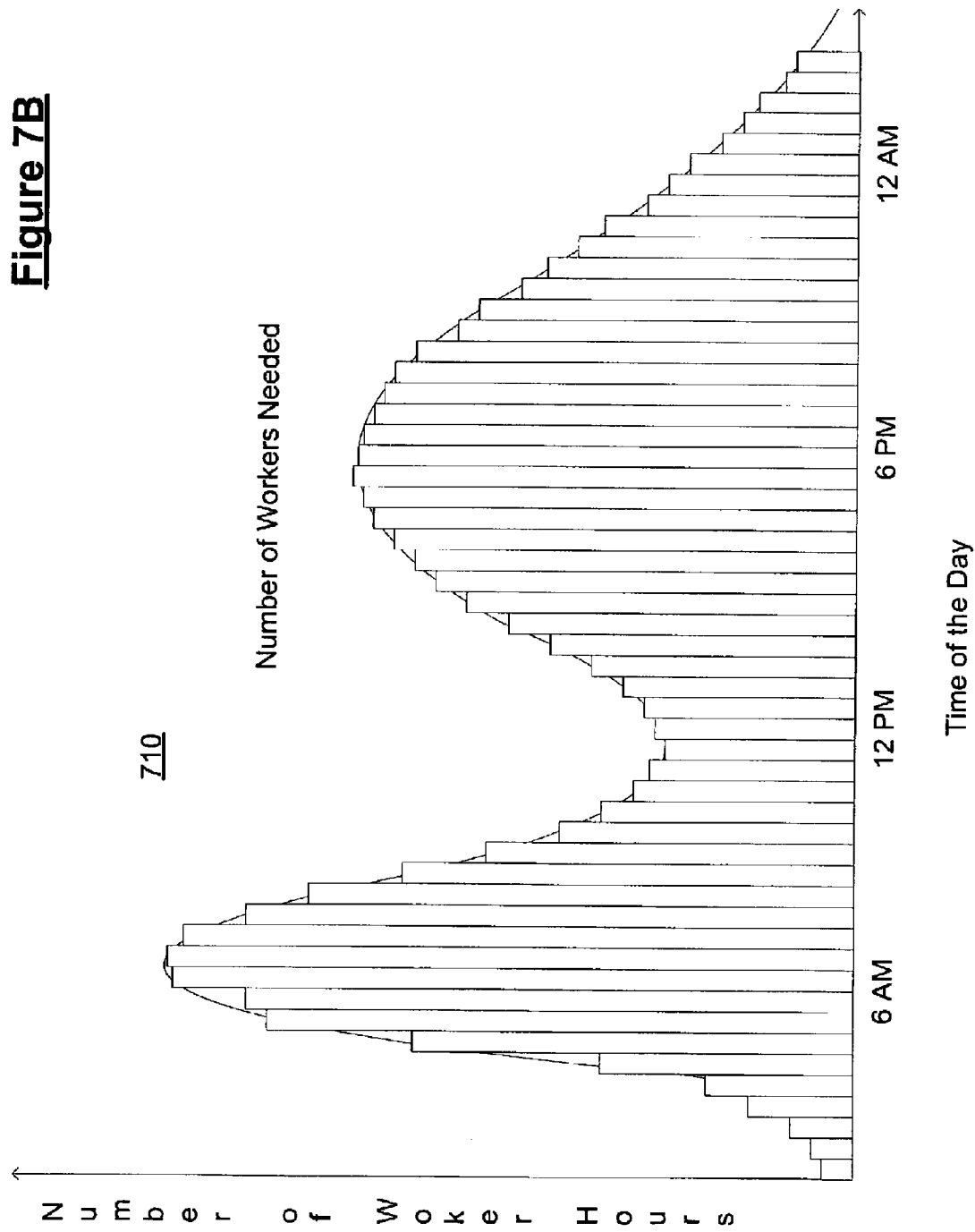

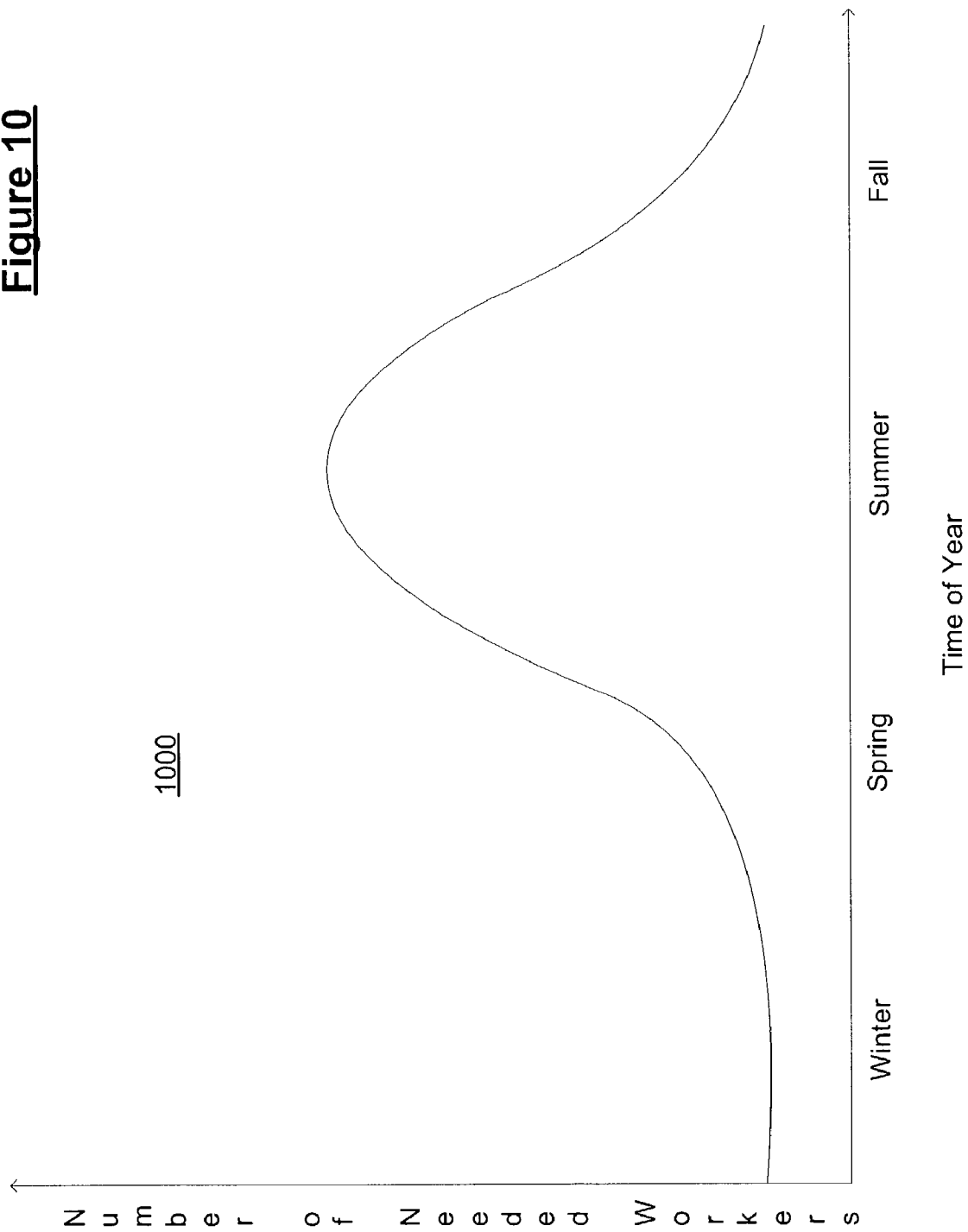

EFFECTIVE SECURITY SCHEDULER

FIELD OF THE INVENTION

The present invention relates to a system and method for the effective and efficient scheduling of personnel at a security checkpoint. Effective and efficient scheduling closely matches staffing levels with staffing requirements while meeting personnel demands, staffing constraints, and performance measures.

BACKGROUND OF THE INVENTION

In general, security staffing has been determined somewhat arbitrarily, without concern for the number of people being served by the security staff (i.e., the demand for security screening). Even when security workers are staffed in view of an estimated demand for security screening, the estimate is generally haphazardly formed and unreliable.

Staffing without accurate forecasting of the demand for security screening creates several potential problems. If a security checkpoint is understaffed, the security checkpoint operates below optimal efficiency, potentially delaying people passing through the checkpoint. Conversely, the overstaffing of security personnel leads in an inefficient condition in which some of the security personnel are idle, resulting in excess labor costs.

One difficulty in security staffing in view of the demand for security screening is that demand levels are difficult to forecast. Specifically, demand levels often vary greatly. For instance, the number of people traveling at airports or seaports varies wildly, causing demand for security screening in these locations to vary correspondingly. Similarly, the number of people entering a public venue varies as events approach. Furthermore, customer behavior can differ greatly, depending on the location, the event, the time, etc.

Accordingly, the number of security workers should closely match the staffing levels needed for the public's demand for security screening. However, this type of staffing is quite difficult to implement since security workers cannot be assigned instantaneously in desired quantities. For example, each of the security workers is employed each day for a shift of fixed duration (generally 8 hours), a fixed number of shifts staffing period (typically five days per week). Also, security workers may not accept fluctuating starting and ending times. Furthermore, employment rules and security regulations place limitations on staffing, such as a regulation may require that checkpoint workers work five or less consecutive days and must receive at least two rest days per week.

SUMMARY OF THE INVENTION

Thus, it is the goal of the present invention to provide a tactical tool that has the flexibility to incorporate the unique characteristics of any security checkpoint and to forecast the number of personnel necessary to assure that desired service levels are met.

Another goal of the present invention is to provide an operational tool that gives the ability for a security checkpoint to optimize workers' schedules based on demand and individuals' qualifications. This capability further assures that business rules such as breaks and qualifications are met.

It is a further goal of the present invention to provide a strategic tool enabling decision makers to understand the cost and performance impacts of alternative policies. In this way, the present invention could provide flexibility to shape policy based on information, not just intuition.

Another goal of the present invention to forecast security staffing needs over an extended period and to staff security personnel according to the forecasted needs. In this way, security checkpoint management may match seasonal demand fluctuations using hiring lead times and managed attrition to enable staffing over an extended period as needed to meet desired service levels. The modeling of demand at different times and the appropriate staffing according to these demands should occur during or before a budget cycle so that the management of a security checkpoint may anticipate casts and plan accordingly.

In response to these and other needs, the present invention provides a system and method for effectively staffing security workers. In accordance with an embodiment of the present invention, the method includes the steps of forecasting security screening demand at different times, determining the number of security employees needed to meet the estimated demand for security screening according to security performance concerns, and then forming a work schedule that staffs the needed number of security employees. In other embodiments of the present invention, the effective security scheduling method may further include the steps of implementing the proposed security schedule and adjusting the security scheduler in accordance with employee requests and results from previously implemented schedules.

In a particular implementation, the present invention has specific application to staffing security checkpoints. In this embodiment, the number of needed open stations in security checkpoints is determined by translating the variable demand for security at different times and using linear programming to optimize and determine a schedule as needed to staff the needed number of open stations.

In another embodiment, the present invention may be used to provide a strategic tool enabling decision makers to understand the cost and performance impacts of alternative directives and general policies. The invention may be used to compare optimal staffing cost with and without the implementation of a security directive or policy. Specifically, the present invention may be used to determine the change in staffing costs from modifications to work schedules necessitated by the implementation of the security directive or policy.

In another embodiment, the present invention provides a software-based application for effectively scheduling security personnel. The software-based application includes a module for modeling the security checkpoint to forecast security screening demand at different times and to determine the number of security employees needed to meet the forecasted demand. The software-based application further includes a module for forming a work schedule that staffs the forecasted need for security personnel. The software-based application may further include modules for implementing the work schedule and for modifying the work schedule as needed.

BRIEF DESCRIPTION OF THE DRAWINGS

These and other advantages of the present invention are described more fully in the following drawings and accompanying text in which like reference numbers represent corresponding parts throughout:

FIGS. 2A-2C are exemplary charts depicting the relationship between actual security staffing and demand for security staffing in accordance with embodiments of the present invention;

FIG. 7B is an exemplary chart depicting the relationship between security demand and a corresponding number of security stations in the checkpoint needed to accommodate that security demand in accordance with an embodiment of the present invention;

FIG. 10 is a chart depicting exemplary changes to the number of needed security workers over an extended period.

DETAILED DESCRIPTION OF A PREFERRED EMBODIMENT

The present invention generally provides a system and method of staffing security workers as needed to accommodate demand for security screening. Demand for security screening varies according to the number of people needing security at a location. Generally, as more people enter a location, more security officials are required at that location in order to provide a desired service level. While the remainder of this application refers specifically to staffing at a security checkpoint, it should be appreciated that the present invention may be used to staff any security officials, regardless of their post. If used to staff security workers outside of security checkpoints, the present invention may use different models for estimating security screening demand. The staffing of security workers outside of the checkpoint is described in greater detail below.

Figure 1A:
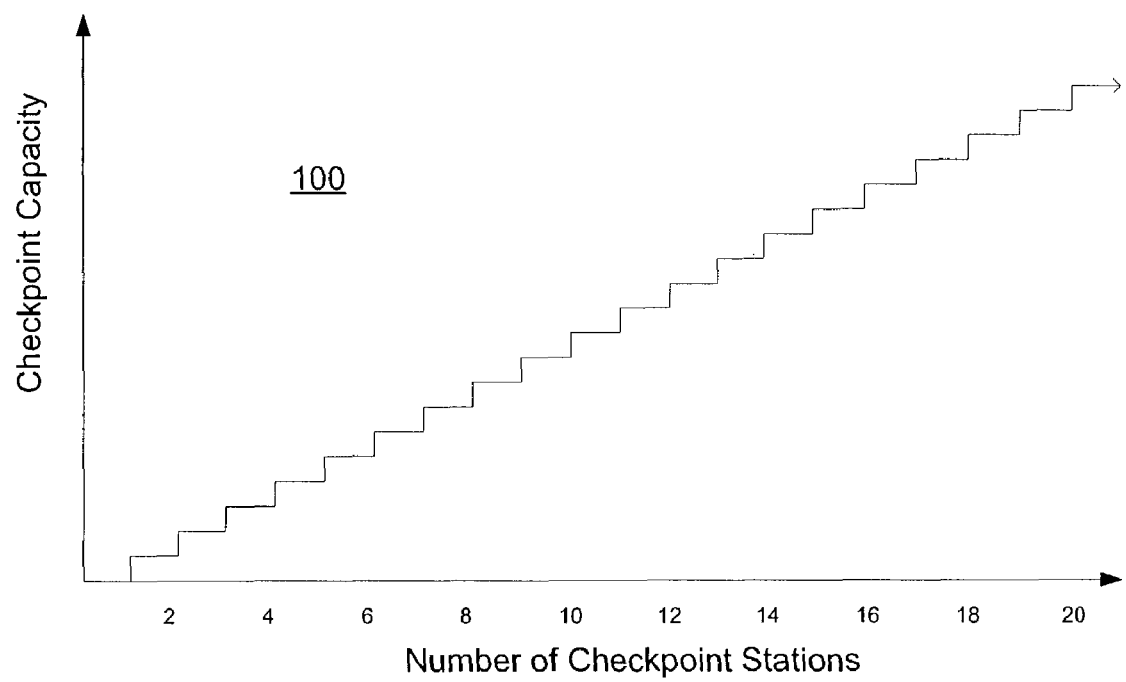
FIGS. 1A-1B are exemplary charts depicting the relationship between security staffing and security capacity in accordance with embodiments of the present invention.

FIG. 1A is a capacity-to-station graph 100 that depicts the number of people that can pass through a checkpoint as a function of the number of stations in the checkpoint. Each of the stations operates separately. As can be expected, the capacity of the checkpoint is approximately a linear function of the number of stations since the security stations function independently. Thus, the capacity of a checkpoint may be modified as needed by adjusting the number of security stations. In this context, a partial station is incompletely staffed, thereby operating below optimal efficiency. The partial staffing of a station is described in greater detail below. The capacity-to-station graph 100 is roughly shaped as a step function because the checkpoint capacity increases with the opening of each additional security station.

Each of the stations is separately staffed with a number of employees as needed. For instance, a security station may use five employees, each manning a component of the security station (a walk-through metal detector, an x-ray machine, a hand-held metal detector, a station to manually search personal belongings, and an area to perform other security tests). Obviously, any number of people may be staffed to a station. A station may also be partially staffed, operating a lower level of throughput as the security workers are required to perform more than one function. Furthermore, additional workers may be staffed to a security checkpoint to improve the throughput of that station. In this way, the capacity of security checkpoints generally corresponds to the number of security workers staffed at the security stations.

Figure 1B:
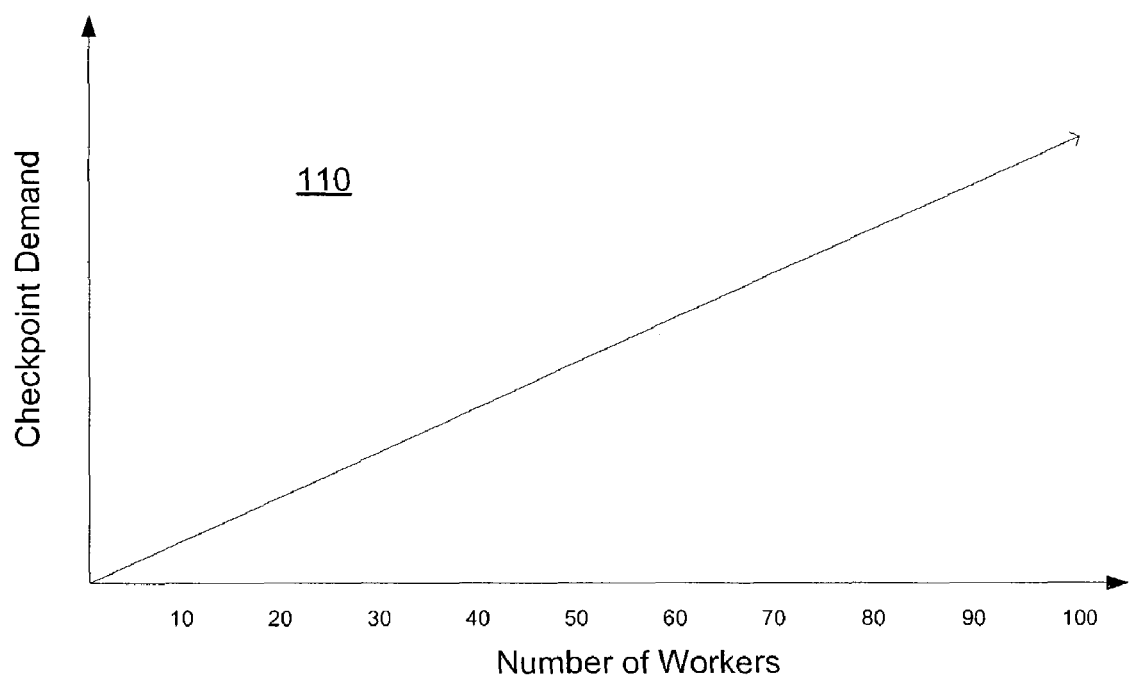

Corresponding to the capacity-to-station graph 100 from FIG. 1A, FIG. 1B depicts a demand-to-employee graph 110 that represents the number of people that can pass through one or more checkpoints as a function of the number of workers at the checkpoints. Thus, the demand of a 10 checkpoint may be met as needed by adjusting the number of employees at the security stations as described above.

As described above, a non-optimized work schedule may result in inefficient staffing levels. Turning now to FIG. 2A, a non-optimized scheduling chart 200 represents a uniform staffing level, represented by the number of staffed workers 220, that does not vary with changes in the number of needed workers 210. For instance, the number of staffed workers 220 may represent the average number of needed security workers. At times, such as the time periods around 6 AM and 6 PM, the security checkpoint is understaffed, in that the number of needed workers exceeds the number of staffed workers. In this situation, long lines may form at the security checkpoint. Conversely, the security checkpoint may also be overstaffed at times (such as the time period around 12 PM). The excess capacity results in inefficient labor allocation and unnecessary labor costs. The non-optimized scheduling chart 200 graphically depicts the overstaffing as the difference between the number of required employees, line 210, and the number of employees working, line 220.

In most checkpoints, security workers are typically staffed using block scheduling. FIG. 2B. schematically represents a block scheduling scheme in which a certain number of security workers are employed from 12 AM to 12 PM, and a second number of security workers are employed from 12 PM to 12 AM. It should be appreciated that most checkpoints are not staffed in twelve-hour blocks, and that this example is provided merely for illustration. In FIG. 2B, line 210' represents the number of required security employees (corresponding to FIG. 2A), and line 220' represents the number of security employees working in the twelve-hour block scheduling scheme. With block scheduling, the security workers are typically understaffed at times, and overstaffed at other times. As described above, overstaffing is inefficient and results in excessive labor costs, while understaffing results in excessive delays as the security workers are unable to meet demand for security screening.

In response, the present invention provides a system and method for the effective and efficient staffing of employees at the security checkpoint. The present invention operates by forecasting the demand for security screening, determining the number of security stations in a checkpoint needed to satisfy this forecasted demand, and then creating an effective work schedule that staffs as needed to achieve desired performance measures, and therefore effectively staffing security workers.

Figure 3:
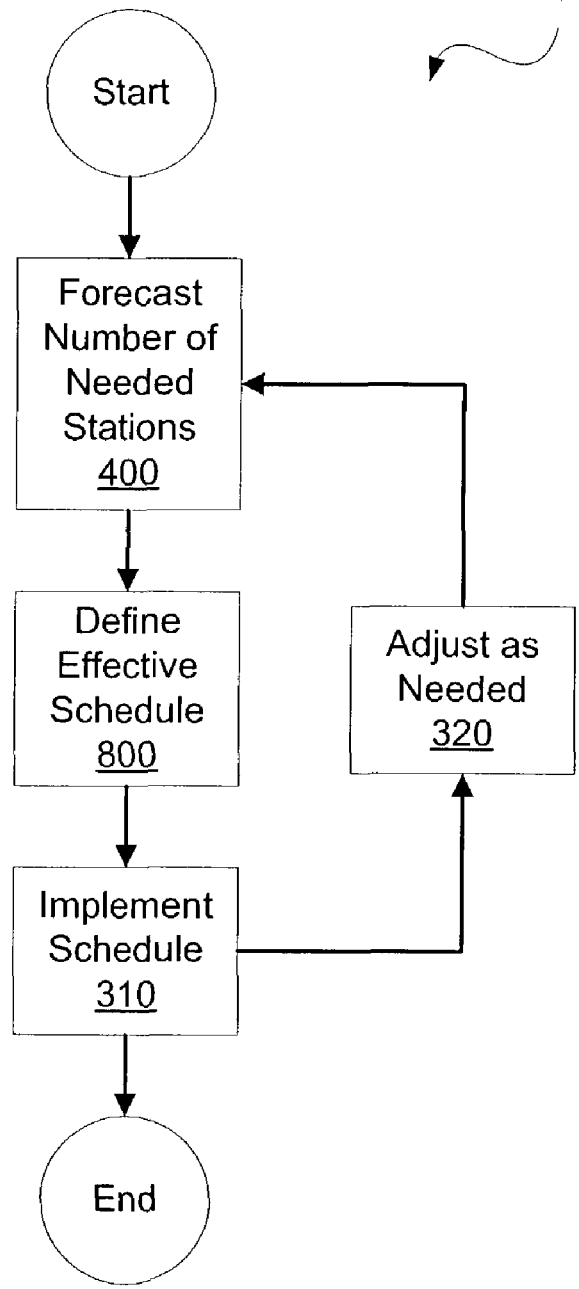
FIGS. 3, 4A-4D, and 8A-8C are flowcharts depicting the steps in a method for effective security scheduling in accordance with embodiments of the present invention.

Turning to FIG. 3, one embodiment of the present invention is an effective security scheduling (ESS) method 300. The ESS method 300 includes the steps of: forecasting the number of security stations to be open at the checkpoint at different time periods, step 400 and defining an optimized work schedule, step 800. The ESS method 300 may optionally also include the steps of implementing and analyzing the optimized schedule, step 310; and adjusting the security work schedule as needed, step 320. Each of these steps is described in greater detail below.

Planning

Figure 4A:
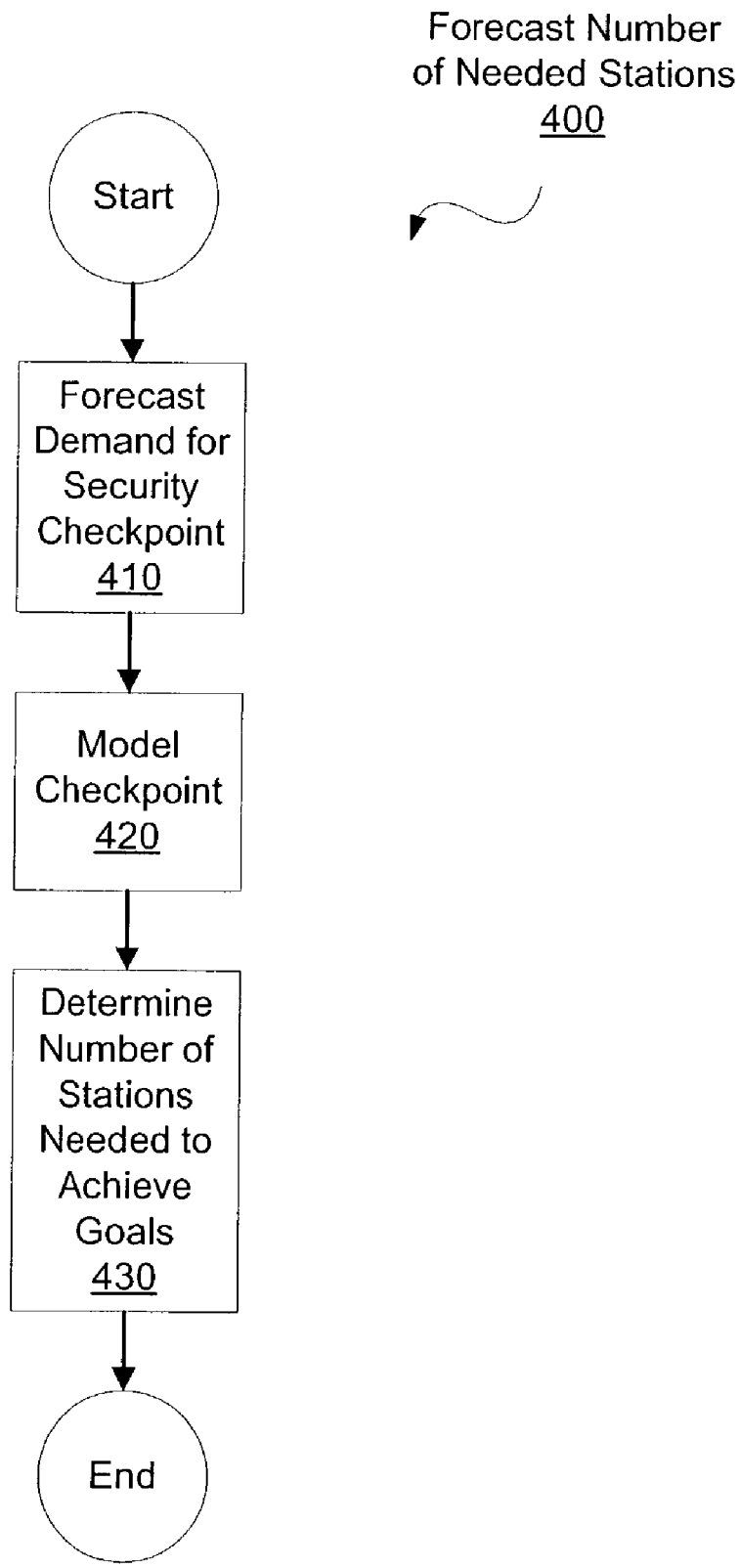

In accordance with an embodiment of the present invention, a process for forecasting the number of workers needed at the security checkpoint at different times, step 400, is illustrated in FIG. 4A. A first action in step 400 is to forecast security screening demand at that location, step 410, by collecting demand data on the number of people passing through the security checkpoint. For instance, the number of people passing through a security checkpoint may be empirically determined through manual or mechanical counting.

Figure 4B:
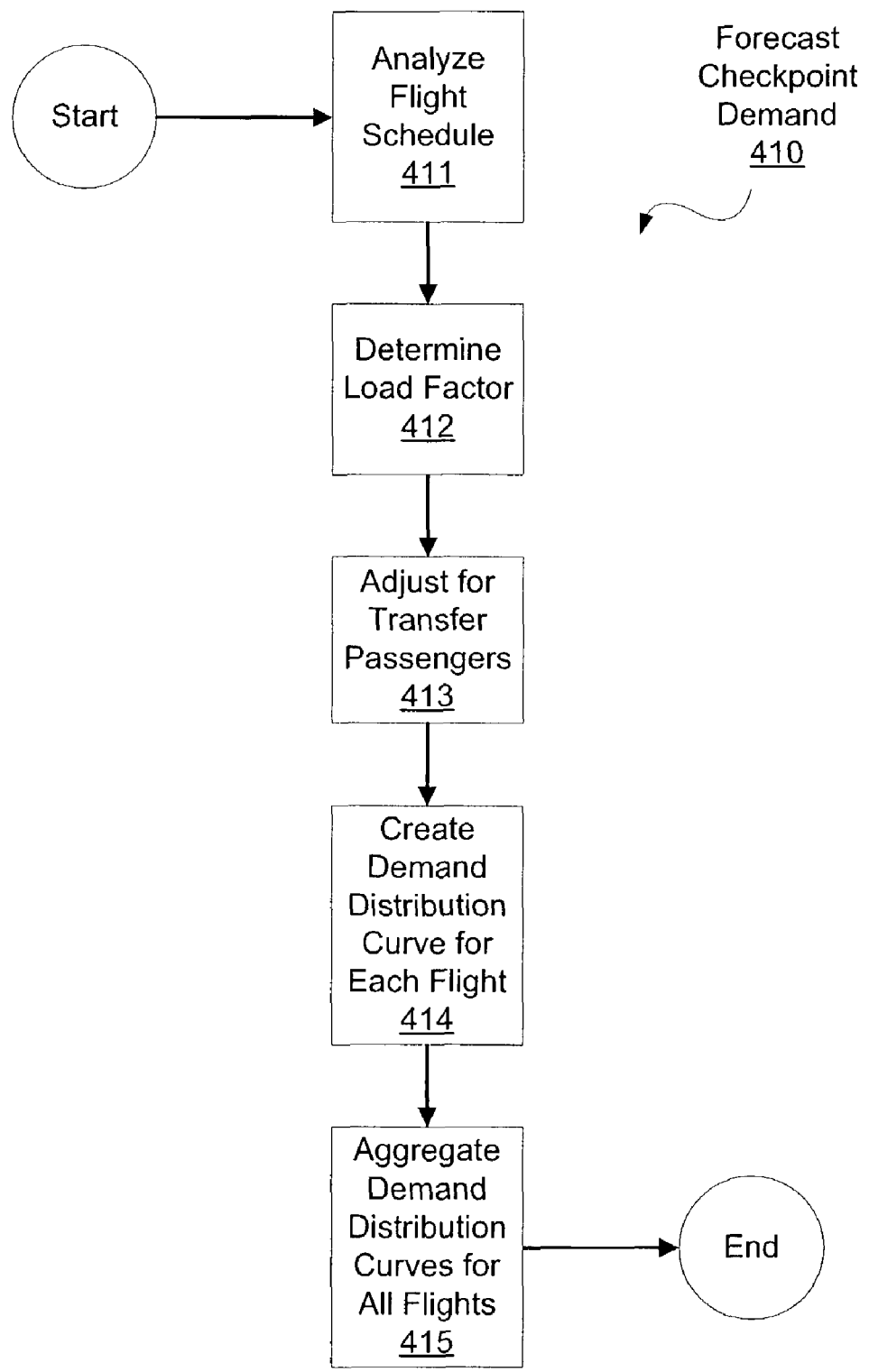

Preferably, the demand data is automatically and dynamically determined, as illustrated in FIG. 4B. In the context of an airport or seaport, the number of passengers can be estimated by connecting to reservation systems or to similar passenger record systems. Then, flight or ship schedules can be analyzed, step 411, to determine a total potential number of passengers. This capacity of passengers may be multiplied by a load factor (i.e., the actual percentage of seats sold) in step 412 to determine the actual number of passengers. This number is then adjusted for the number of passengers transferring from previous flights, step 413, to determine the number of passengers actually originating from the particular location and, therefore, actually passing through the security checkpoint. For example, if a flight has a capacity of 200 passengers and if the load factor is 75% (¾), then 150 passengers should be on the flight. Of these 150 passengers, if a third (⅓) has transferred from other flights, then the remaining 100 passengers pass through the security checkpoint at that airport.

Continuing with the airport scenario, a demand distribution curve (also known as a check-in curve) may be created and used to determine the instantaneous number of people passing through the security checkpoint, step 414. With passengers at an airport, the demand curve reflects the time before departure that passengers arrive at the checkpoint.

Figure 5:
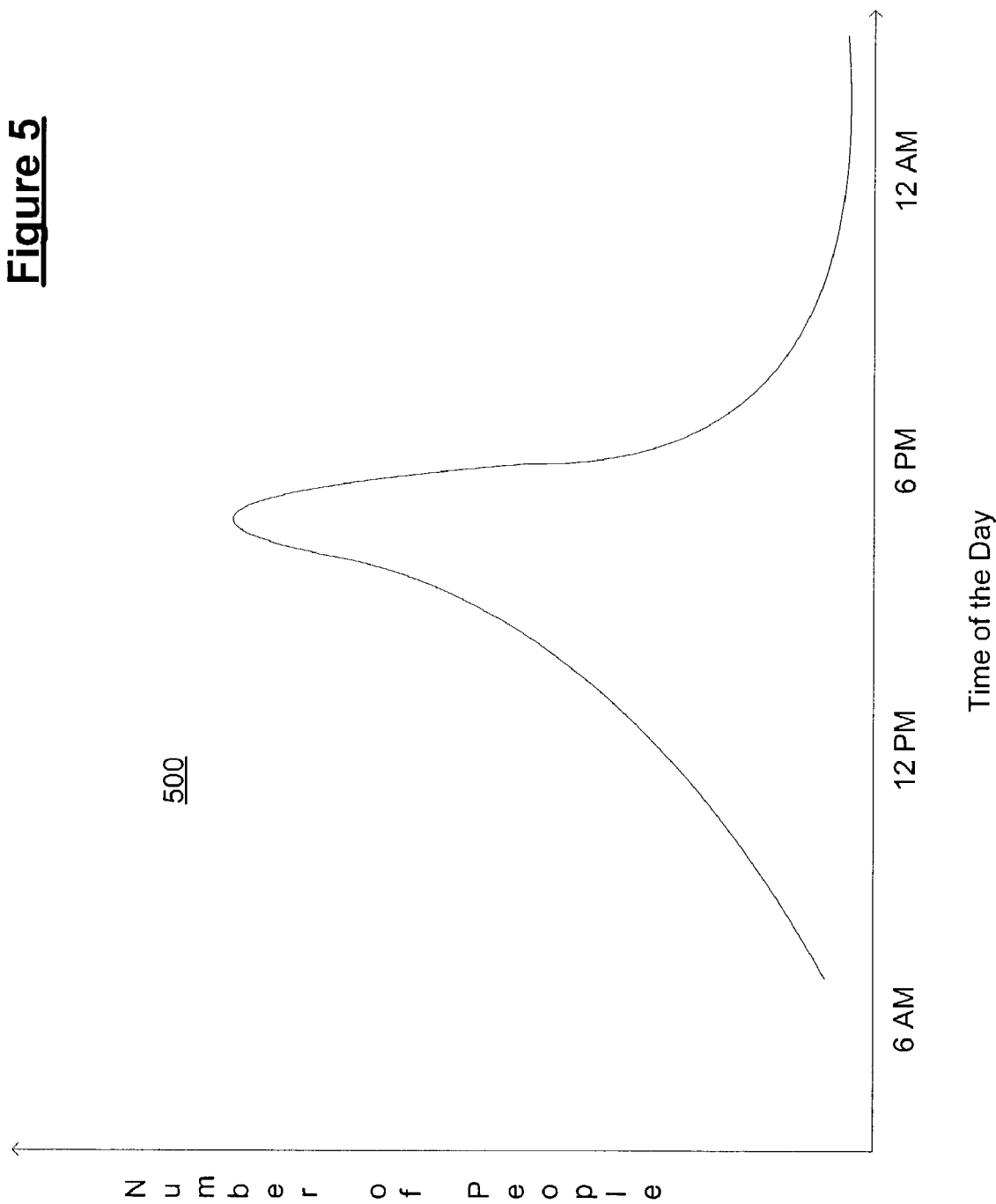
FIGS. 5 and 6A-6B are exemplary charts depicting security demand in accordance with embodiments of the present invention.

FIG. 5 depicts an exemplary demand curve 500 representing the demand attributable to a single event at 6 PM, such as a flight or a public event. In curve 500, increasing numbers of people arrive at the checkpoint before 6 PM, but the number of the people drops off rapidly thereafter.

Figure 6A:
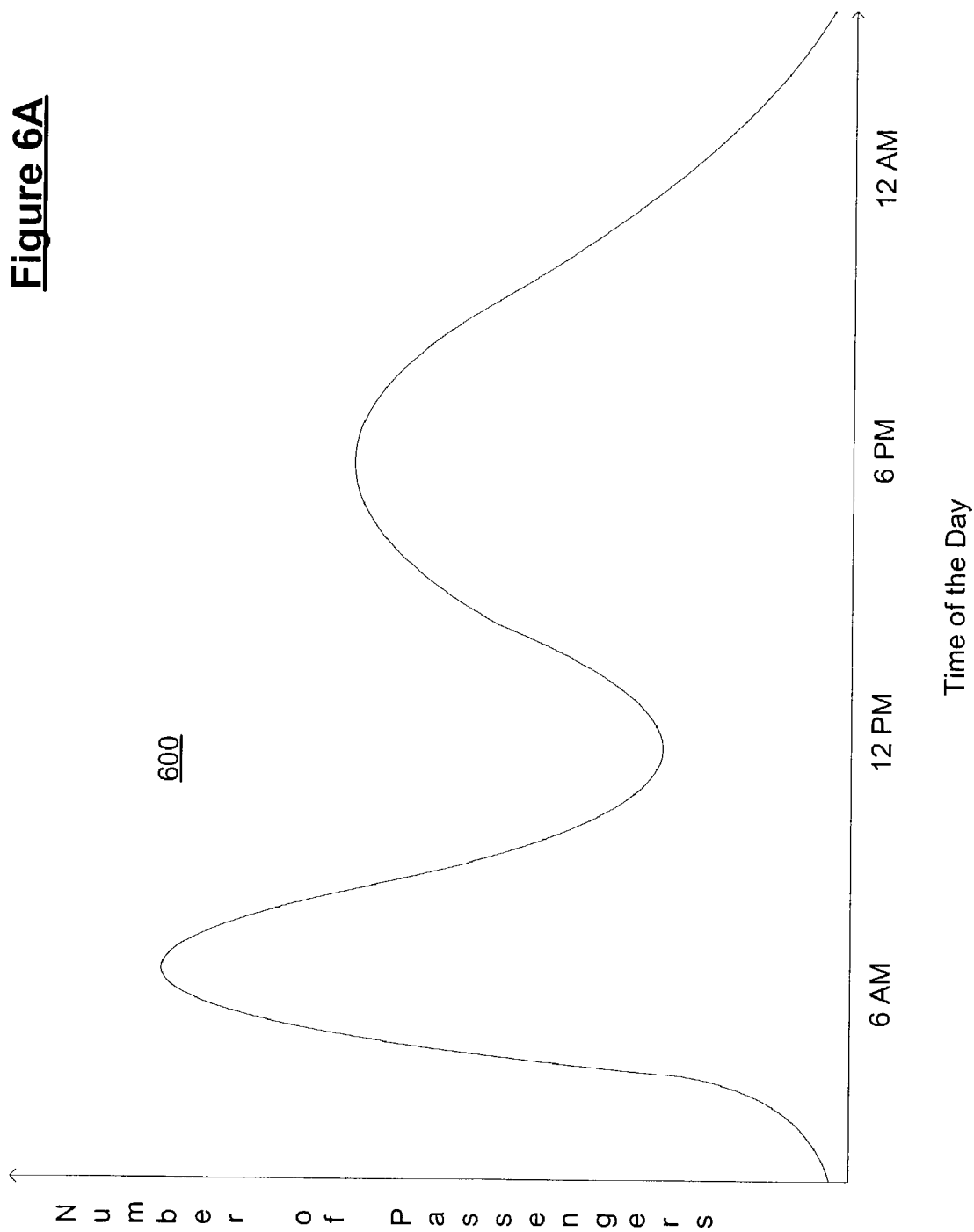

The demand curve for each flight or event, such as demand curve 500 depicted in FIG. 5, is then totaled, step 415, to calculate the total number of people passing through a checkpoint at any particular time or time period. FIG. 6A depicts an exemplary total demand curve 600 having peaks around 6 AM and 6 PM. Locations, such as airports, typically have one or more peak periods during the day corresponding with periods of high traffic. In the same way, a demand at a security checkpoint generally vary over longer periods with resulting peak days, peak weeks, etc.

Figure 6B:
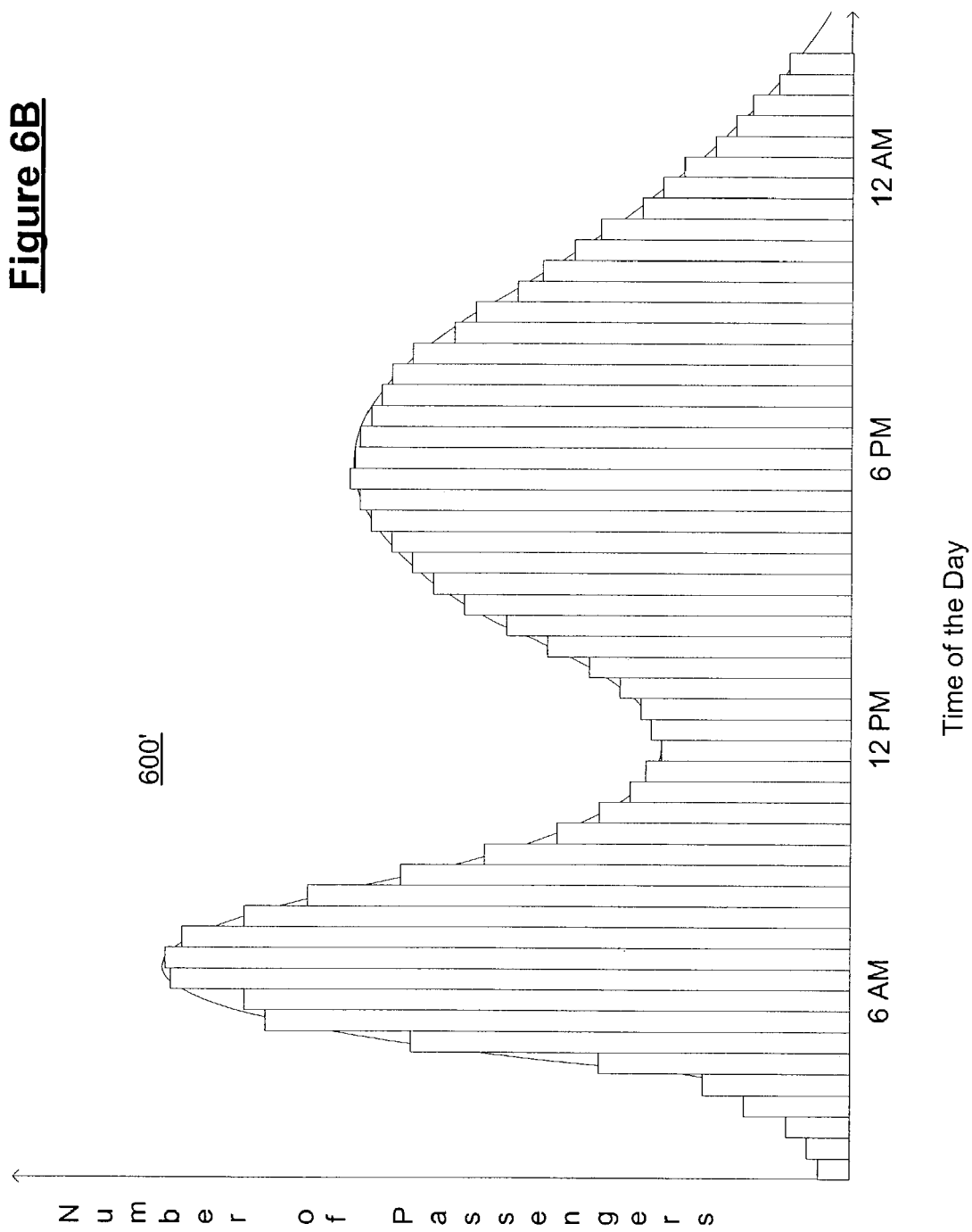

The number of passengers arriving at the security checkpoint may be divided into fixed time periods, such as 30-minute intervals. The average demand during each of the periods may then be displayed, as illustrated in total demand curve 600' in FIG. 6B, as the horizontal line in each of the boxes. The overall number of passengers during the time period will be the area of the box, or the average demand multiplied by the time period.

It should be appreciated that the above-described method for estimating demand at the security checkpoint, while presented in the context of an airport or seaport, may be used in a variety of circumstances. For instance, the above-described method may be used to determine security screening demand at a large volume event, such as a concert or sports contest. The total number of people may then be estimated as the number of ticket-holders minus forecasted non-attendance. The instantaneous demand at the security checkpoint may then be determined at using a demand curve for the event.

Obviously, the demand for security screening may be adjusted for other factors. For instance, if the non-ticketed public is allowed within the location, then the demand should be adjusted for these additional people. Similarly, a location may contain several checkpoints, and the demand may be determined separately for each of the checkpoints or for the entire location.

Using the demand data determined in step 410, the checkpoint may be modeled using various modeling techniques, step 420. Process modeling is well-known technology, and various techniques may be used to produce a model of the security checkpoint given the input data collected in step 410.

The security checkpoint may be modeled in step 420 using a certain number of open stations. The security checkpoint is then modeled again using a different number of open stations. The results from the two models may be compared to choose a desirable number of open stations. Typically, reducing the number of stations is detrimental to service measures, such as waiting time, but reduced employment costs. In this way, the model may then be used to provide a fact-based forecast of the varying number of stations. It should be appreciated that the modeling of the security checkpoint does not schedule workers. Instead, the model provides an optimal number of open stations per time period as needed to meet various service measures (and thus, the optimal number of security workers for each of the time periods). The actual staffing of the security workers is described below.

Figure 4C:
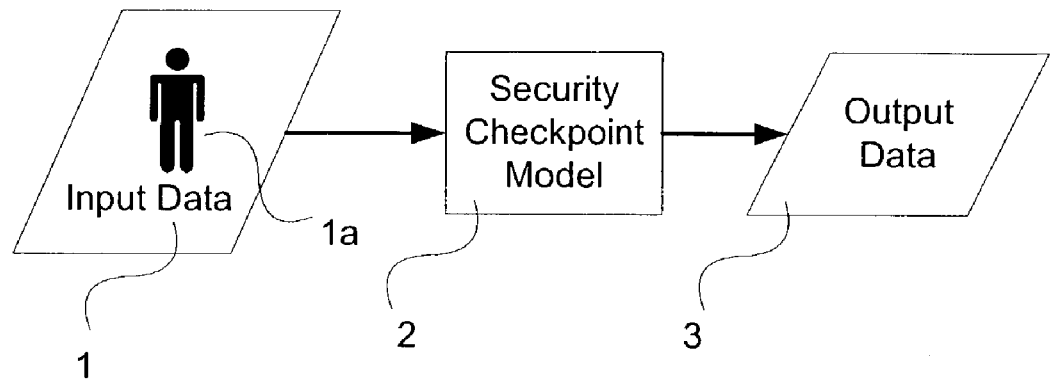

Security checkpoints may be modeled and simulated in step 420, as depicted in FIG. 4C, using a black-box security checkpoint model 2 that receives input data 1 and produces output data 3. The input data 1 generally corresponds to the number of people 1a entering the security checkpoint. The output value 3 generally includes measurements of customer experience (such as wait time, processing time, queue length, etc.) based on checkpoint demand, alarm rates, processing times, scheduled resources, and security policies.

The black-box security checkpoint model 2 functions as a black-box having a set of possible output values and some type of rule for selecting from the set of possible output values. For example, output data 3 may include customer wait time in the security checkpoint, where the process or service time for security checkpoint model 2 may be bounded by a minimum and a maximum time, such as 10 and 100 seconds. Particular process, service or activity values for each simulated person may be randomly assigned according to a statistical distribution, such as uniform, normal, Poisson distributions, etc. The particular values and distribution used in the black-box-style security checkpoint model 2 may be selected as necessary to conform to an actual security checkpoint. For instance, the actual process times at a security checkpoint may be measured to determine a minimum value, a maximum value, and a distribution of process times between these values. The customary wait time is then a function of the process time and number of resources in the checkpoint model.

In this way, the black-box-style security checkpoint model 2 aggregates together the individual tasks and processes occurring in the security checkpoint to determine output values. While the black-box-style security checkpoint model 2 illustrated in FIG. 4C is able to simulate an existing security checkpoint, this type of model has a limited ability to predict the effects of changes in the individual tasks and processes occurring in the checkpoint. Specifically, the black-box model 2 does not match up resources to activities in the checkpoint. While someone may attempt to use the black-box model 2 to predict the effects of changes by varying the output value ranges or the distribution of the values, the predictive accuracy of the black-box model 2 is generally poor. In particular, the effects of changes in one or more of the individual tasks and processes occurring in the security checkpoint are not easily represented through the black-box model 2 because these the individual tasks and processes are not separately replicated.

Figure 4D:
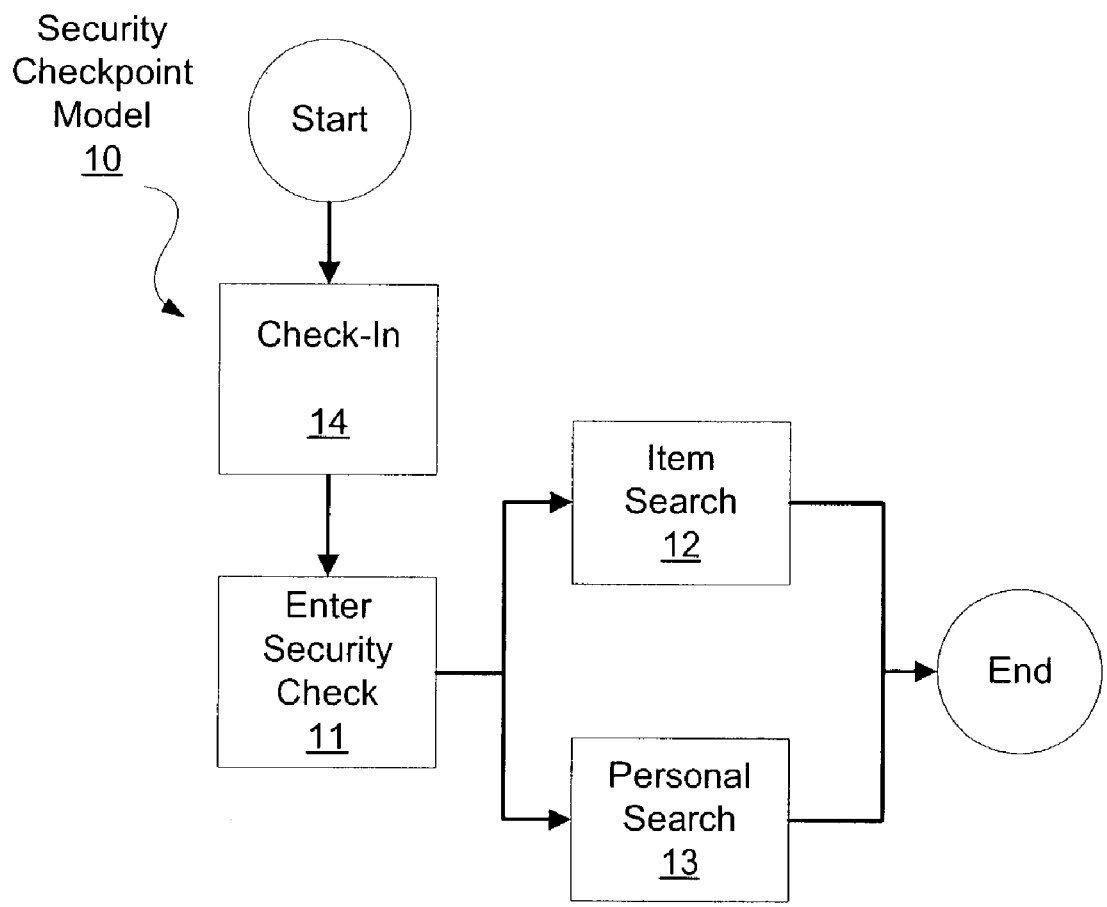

In a preferred embodiment of the present invention, the security checkpoint is modeled as described in co-owned U.S. patent application Ser. No. 10/293,469 entitled SECURITY CHECKPOINT SIMULATION, the disclosure of which is hereby incorporated by reference in full. U.S. patent application Ser. No. 10/293,469 provides a security checkpoint model 10, as depicted in FIG. 4D, having two or more processes, such as entering the security checkpoint in step 11, screening items in step 12, and screening people in step 13. This security checkpoint model is more similar to an actual security checkpoint. Each of the steps 11, 12, and 13 may be separately simulated to produce output values as described above. Thus, each of the steps 11, 12, and 13 may be separately modeled black-boxes. For instance, a user may define rules for simulating output values for each of the steps 11, 12, and 13. To model changes in the checkpoint, the values or distribution for steps 11, 12, or 13 may be adjusted. By adjusting values for separate steps, the passenger checkpoint model 10 more accurately approximates changes in a passenger checkpoint.

One or more of the steps 11, 12, and 13 may be further decomposed into one or more separate substeps. Then, each of the substeps of steps 11, 12, and 13 may be separately modeled processes having user-defined rules for simulating output values, which are aggregated to produce total output values for steps 11, 12, and 13.

In another embodiment, the security checkpoint model 10 may also consider the effects of passenger check-in 14 on the passenger demand for security screening, as further described in the above-cited U.S. patent application Ser. No. 10/293,469. In general, an extended check-in period serves to buffer the security demand. Specifically, the security checkpoint model 10 may be adapted to consider processes occurring in an airport before a passenger enters a security checkpoint. Typically, certain percentages of passengers check-in at various check-in locations, such as curb check-in, counter check-in, or self-serve check-in. These percentages are predetermined and may be selected as needed, and if one of the check-in locations is not present in an airport of interest, its associated usage percentage may be set to zero. Alternatively, passengers may also choose to not check-in and instead proceed directly to the security checkpoint.

During the check-in process in step 14, the passenger may also check-in baggage, and a certain percentage of the baggage may then be screened. For instance, baggage may be screened using an Explosive Detection System (EDS). The EDS tests baggage for explosives by scanning the internal contents of baggage placed in the EDS. The percentage of the bags searched during check-in step 14 is predetermined and may be defined as specified above. If there is no desire to simulate the EDS or other methods of screening checked-in baggage, the percentage of passengers affected by these processes may be set to zero. Similarly, if the airport safety rules change to require screening of all baggage, the percentage may be increased to unity, or 100%.

The sub-steps in the baggage screening during check-in step 14 may also be separately modeled. For example, the baggage is typically loaded into the baggage screening device, and the baggage screening device checks the baggage. The next sub-step depends on whether the baggage screening device sounds an alarm. If the baggage screening device or personnel manning the device sounds an alarm, the alarm is resolved before the baggage is cleared for transport, such as a search by hand.

As described in U.S. application Ser. No. 10/293,469, the models 2 and 10 may also be used to calculate the effect of policy changes such as estimating the impact of adding another security test or incorporating different security equipment. Specifically, the model supports data modeling and simulation by provided quantitative modeling support and analysis to develop fact-based recommendations for policy decisions. For example, the model 10 may be used to simulate checkpoint staffing requirements such as a required number of wanders, bag searchers, etc. for various checkpoint configurations. The model 10 may also be used to simulate checkpoint equipment requirements, such a required number of X-Rays machines for various station configurations. The model 10 may further be used to recommend checkpoint staffing for peak volume and non-peak operations. Similarly, the model 10 may be used to assess (1) continuous (random) policy compliance levels for security devices; (2) the impact of alternative, gender based scanning policies; (3) the impact of eliminating or adding various screening steps in the security checkpoint; (4) the impact of check-in counter wait time on security checkpoint demand; or (5) the impact of reduced station staffing on checkpoint operations.

The data modeling provides analytical support for security checkpoint operations focusing on resources requirements (equipment & staffing), process performance, customer experience and cost. For instance, the model 10 may be modified to provide analytical support for various resource requirement policy concerns such as: Employee work rules (impact of number of breaks, lunch, training etc.); reduced checkpoint staffing requirements (impacts of reduced staff on checkpoint operations); reduced airport staffing requirements (optimized scheduling of shared resources across airport); new staffing requirements based on process changes (i.e. checkpoint selectee screening); or annual labor planning based on seasonal demand (Workforce management on annual basis). Specifically, the addition/subtraction of requirements in a checkpoint may be modeled through the addition/elimination of substeps in the model 10.

By varying the values in the model 10, the model 10 further provides analytic support for various checkpoint process change policies concerns such as: Process changes or re-designs (i.e. new security directives which change process steps or time); new technology inserted into the existing or redesigned process (i.e. new type of x-ray); or emergency response planning (concourse dumps, checkpoint shutdowns, etc.). Specifically, these process changes refer to modification of processes already included in a model 10.

The present invention may also provide analytic support for various customer experience policy concerns such as: alternative service level requirements (i.e. different service levels for non-peak operations); alternative queue management techniques (i.e. "show times" for passengers); or designated and dedicated stations and lines (i.e. designated stations for premium customers). As described in greater detail below, the present invention works by modeling the security checkpoint and then specifying a range of values (e.g., the number of open stations) that results in acceptable customer experiences. Generally, to represent the changes in customer experience policy concerns, the set of acceptable ranges is modified as needed to achieve the new standards for customer experiences.

As described above, the model produced in step 420 may be used to determine the impact of changing the number of stations. Using this model, a decision maker may determine the number of stations needed at the security checkpoint at various different times, step 430. Likewise, the model may be used to allocate security machinery at the checkpoint. These decisions are typically made to achieve various performance measures of the security checkpoint, and the desired number of stations will be the smallest number needed to achieve the desired performance measure. For example, the security checkpoint may have a maximum desired wait time (such as 10 minutes) during peak periods on average or busy days, and the effective work schedule staffs the number of stations as needed to achieve this wait time during different time periods. In this way, this demand data is then used to determine the number of needed stations, step 430.

Figure 7A:
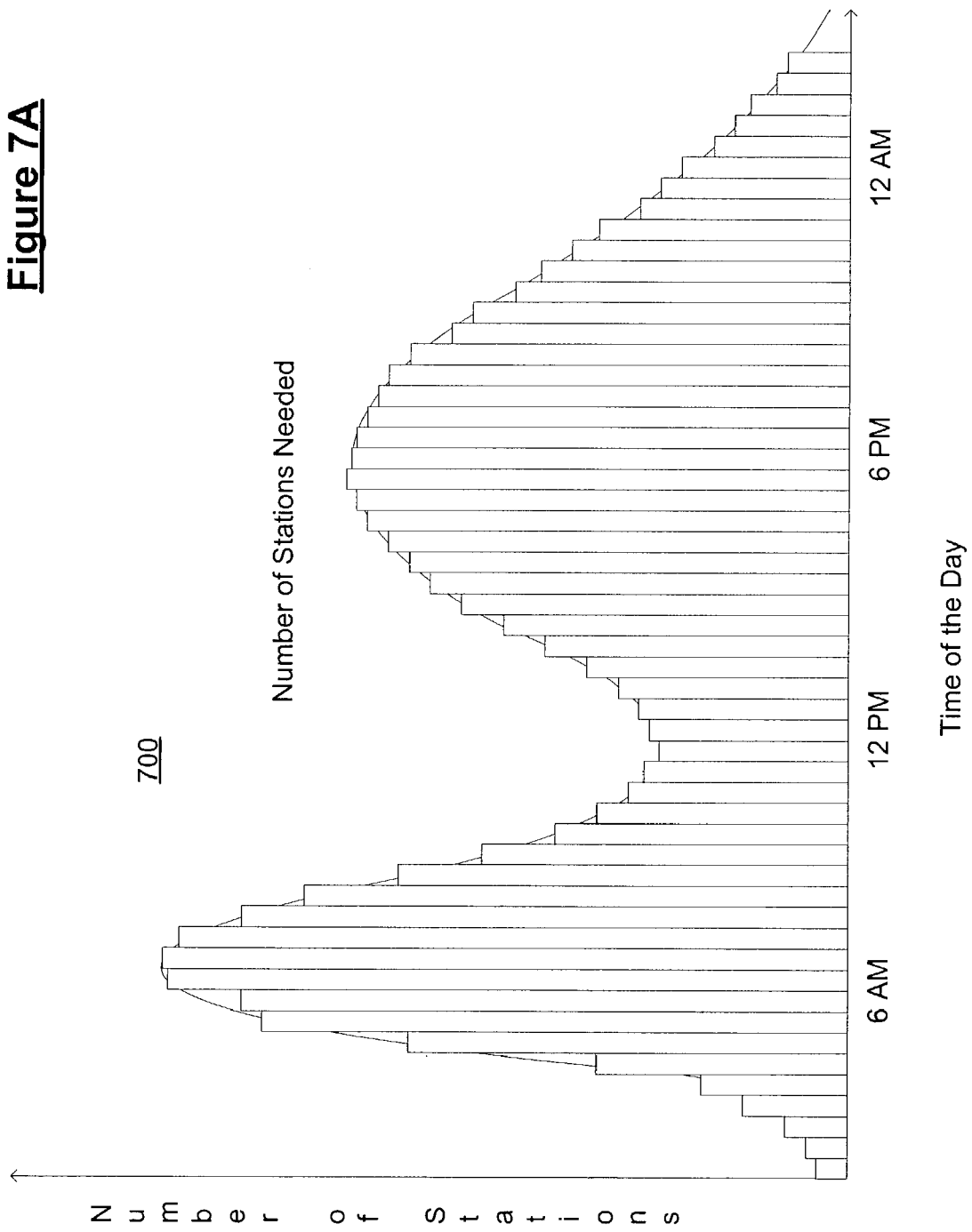
FIG. 7A is an exemplary chart depicting the relationship security demand and a corresponding number of workers needed to accommodate that security demand in accordance with an embodiment of the present invention.

Turning now to FIG. 7A, an optimal open station curve 700 is an exemplary visual display that illustrates the optimal number of open stations and how this optimal number of stations varies at different times. As explained above, the optimal number of open stations varies with demand at the checkpoint. Thus, the optimal open station chart 700 in FIG. 7A corresponds with the total demand curve 600 of FIG. 6A. In the illustrated open station curve 700, the needed number of open stations peaks at 6 AM and 6 PM. If the depicted open station curve 700 represents a security checkpoint at an airport, the demand peaks correspond to peak travel times (or immediately preceding time periods). Alternatively, the open station curve 700 may represent security demand at a public venue hosting events at 6 AM and 6 PM.

The number of open stations may be rounded up to the nearest whole number, thereby ensuring an adequate number of open stations to accommodate the security demand. In a different embodiment, a partial open station may represent a partially staffed station that operates suboptimally but as needed to meet the security demand.

It should be appreciated, however, that the needed number of open security stations calculated in step 400 may be determined through other processes. For instance, the number of stations may be empirically determined based upon prior experiences at the security checkpoints using management skill. Alternatively, the number of open stations may be calculated arbitrarily.

Execution

Figure 8A:
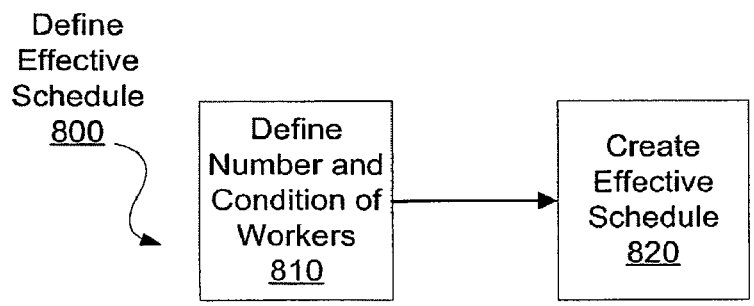

Returning to FIG. 3, an effective working schedule is defined in step 800 using the demand data produced in step 400. Specifically, the demand forecasted in step 400 indicates the number of open stations needed to attain various performance measures. However, the demand forecast does not indicate how to staff workers optimally in view of the forecasted demand. In response, the effective work schedule defined in step 800 allocates workers as needed to staff the number of desired stations determined in the step 400. As depicted in FIG. 8A, the process of defining an effective work schedule in step 800 generally includes determining the desired number of workers in step 810, and 20 creating an effective schedule in step 820.

Figure 8B:
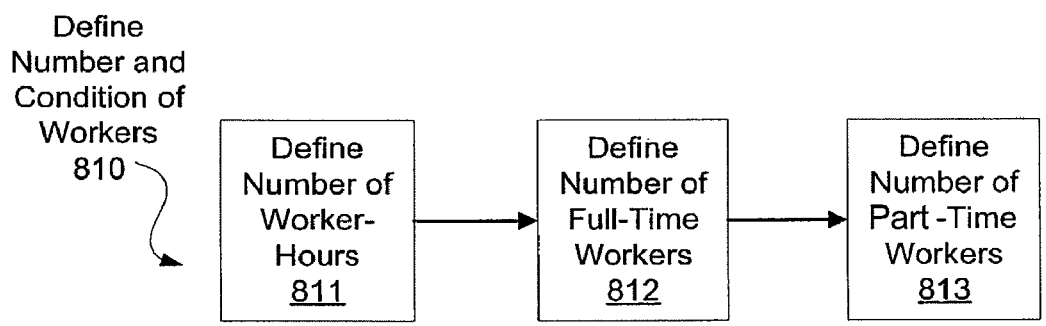

As depicted above in FIG. 7A, the number of desired stations may vary greatly between peak and non-peak periods, so the number of employees should vary correspondingly. Turning now to FIG. 8B, a first step in determining the desired number of workers in step 810 is to determine the minimum number of work hours needed to staff the desired number of stations, step 811. The number of workers is generally represented in worker-hours, corresponding to the number of workers divided by the duration of the time periods of interest. For instance, if 30 worker-hours are required for a 30-minute period, then 60 (or 30½) workers are actually required. Thus, the number of needed stations may be represented in worker hours, as depicted in needed worker hour curve 710 in FIG. 7B. Worker hour curve 710 corresponds to open station curve 700 in FIG. 7A. In particular, as described above in FIGS. 1A and 1B and the accompanying text, the number of workers has a linear relationship to the number of open stations. For instance, where there are five workers per open station, then the total number of workers needed at a particular time equals five times the number of open stations at that time. Obviously, step 811 may easily adjust for other relationships between the number of open stations and the number of needed workers. For instance, some security stations are configured such that problems identified in a first station are addressed at a second station. In that instance, the number of workers is then a function of two or more stations such as requiring nine workers for each pair of security stations.

Continuing with FIG. 8B, a next step in determining the number of workers in step 810 is to define the number of full-time workers and to specify the condition of work for these workers (e.g., duration and frequency of work time, as well as conditions for overtime), step 812. Similarly, another task is to decide the number of part-time workers and the conditions for these employees, step 813. The number of part-time workers may be measured as a fraction of the number of full-time workers specified in step 812. The definition of the workers in steps 812 and 813 are described in greater detail below.

Returning to FIG. 8A, an effective schedule is formed in step 820 using the worker data from steps 811, 812, and 813. In the field of employee staffing and scheduling, several techniques are known to create an optimized schedule using the worker data, such as the information described above in steps 811, 812, and 813. For instance, an optimized schedule for a security checkpoint may be formed using linear programming, quadratic or mixed-integer programming, nonlinear optimization, global optimization, non-smooth optimization using genetic and evolutionary algorithms, and constraint programming methods from artificial intelligence.

In accordance with a preferred embodiment of the present invention, as described below, the effective schedule may be formed in step 820 using linear programming to optimize a chosen value (such as minimizing labor costs or the number of work hours) according to a series of equations representing to optimize the number of employees, the condition of work for these employees, and the desired scheduled of employees needed, as depicted in FIG. 7B. Linear programming is a proven optimization technique. To optimally match employees working with employees needed over the course of a week, all feasible work tours are explicitly enumerated, and then employees are assigned to these tours. A tour is defined as a set of shifts that an employee works in a single week. The formulation of the scheduling problem is therefore a linear programming problem of the form:

$$A \cdot x \geq b \qquad \text{Eq. 1}$$

where A is a coefficient matrix, x is a tour assignment matrix, and b is the demand matrix. A quantifies the condition of employment for security workers. The column matrix x corresponds to the work schedule being created. The column matrix b quantifies the minimum staffing at the security checkpoint needed to satisfy demand, as defined above.

The dimensions of the matrixes A, x, and b are [m×n], [n×1], and [m×1], respectively. The variable m represents the number of intervals in a time period being scheduled (such as a week), and the value of m depends on the chosen time interval and time period. For example, if the time interval is one hour and the time period equals a week, then m equals 168 (twenty-four hours per day multiplied by seven days per week). If the time interval is fifteen minutes, m equals 672 (four fifteen minute intervals per hour multiplied by twenty-four hours per day multiplied by seven days per week). The total number of feasible tours is n. The value of n can vary greatly based on the precision of the time interval, as well the as the number and type of constraints placed on tours. Such constraints will be further discussed in regards to the coefficient matrix A.

Expanding the matrices in Eq. 1, the scheduling formulation looks like:

$$\begin{bmatrix} a_{11} & a_{12} & a_{13} & \cdots & a_{1n} \\ a_{21} & a_{22} & a_{23} & & \cdot \\ a_{31} & a_{32} & a_{33} & & \cdot \\ \cdot & & & & \cdot \\ \cdot & & & & \cdot \\ a_{m1} & \cdot & \cdot & \cdots & a_{mn} \end{bmatrix} \begin{bmatrix} x_1 \\ x_2 \\ \cdot \\ \cdot \\ \cdot \\ x_n \end{bmatrix} \geq \begin{bmatrix} b_1 \\ b_2 \\ b_3 \\ \cdot \\ \cdot \\ b_m \end{bmatrix} \quad \text{Eq. 1'}$$

So, $$a_{11}x_1 + a_{12}x_2 + a_{13}x_3 + \ldots + a_{1n}x_n \geq b_1$$
$$a_{21}x_1 + a_{22}x_2 + a_{23}x_3 + \ldots + a_{2n}x_n \geq b_2$$
$$\ldots$$
$$\ldots$$
$$a_{m1}x_1 + a_{m2}x_2 + a_{m3}x_3 + \ldots + a_{mn}x_n \geq b_m$$

This is the set of linear equations that is optimized to determine a desirable matrix x used to create the effective work schedule for the security checkpoint in step 820.

Figure 8C:
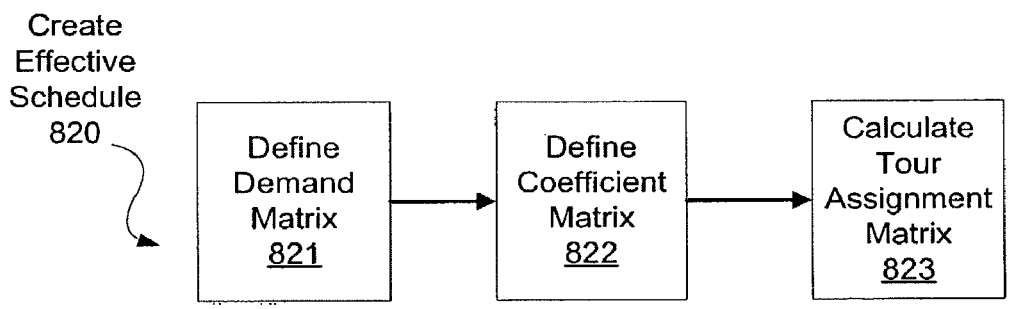

A process for creating an effective work schedule in step 820 is depicted in FIG. 8C. Specifically, the creation of an effective work schedule in step 820 includes the steps of determining the demand matrix b in step 821; determining the coefficient matrix A in step 822; and calculating the scheduling matrix in step 823 using the demand matrix b and the coefficient matrix A.

As suggested above, the demand matrix b determined in step 821 quantifies the minimum staffing at the security checkpoint needed to satisfy demand at the security checkpoint. Specifically, the demand matrix b represents the minimum number of employees required to work at time interval i in order to meet passenger demand for security screening. Demand at interval i is calculated by multiplying the minimum number of security stations required at that time by the number of employees needed to operate a station. The station requirement can be the result of a spreadsheet model of passenger arrivals and a simulation model of checkpoint operation. In the context of stations in an airport security checkpoint, the demand matrix b is sensitive to flight schedules, load factors, transfer rates, passenger arrival distributions, passenger check-in statistics, and the processing characteristics of a station, as described above in the determination of demand data in step 400. An exemplary demand matrix b looks like:

$$\begin{bmatrix} 6 \\ 18 \\ 36 \\ 48 \\ \cdot \\ \cdot \\ 12 \\ 0 \end{bmatrix}$$

Each of the values in the demand matrix b represents the minimum number of workers needed at the security checkpoint during the m intervals. The larger values correspond to peak periods of demand that thereby necessitate higher staffing levels to meet the demand.

Returning to FIG. 8C, the next action is to determining the coefficient matrix A, step 822. As described above, the coefficient matrix A quantifies the condition of employment for security workers. Specifically, the coefficient matrix A indicates if a tour j is working during a given time interval i. In the context of this application, a tour refers to a series of shifts per employee, per staffing period. If a tour is working, $a_{ij}$ equals unity (1). If a tour is not working, $a_{ij}$ equals zero (0).

Scheduling rules and policies dictate the total number of feasible tours, and consequently, the size of the n dimension of the coefficient matrix A. In general, reducing the number of possible tours (i.e., reducing the decision space) causes the coefficient matrix A to be smaller and expedites the linear programming calculations used to find a solution for an effective security schedule. Table 1 provides examples of requirements that determine the size and values of the coefficient matrix A.

TABLE 1

Possible Tour Policies/Requirements

| General Requirement | Definition | Specific Examples |
|---|---|---|
| Tour Duration | Length of time before tour schedule repeats | 1 week<br>1 month |
| Days Off | Number of days off during a tour and when those days off occur | 2 days off per week<br>2 consecutive days off per week |
| Shift Assignments to Tours | Rules dictating how shifts are assigned to tours | All shifts in a tour start at the same time<br>All shifts in a tour are the same duration<br>Tours can have a combination of shift start times and/or durations |
| Shift Start Time | Earliest or latest time of day a shift may begin<br>Start time intervals | No shifts begin after 22:00<br>All shifts start on the hour |
| Shift Duration | Maximum and minimum bounds on shift length | 4 hours minimum shift, 12 hours maximum shift |
| Break Time | Duration and time of breaks | Breaks occur 2 hours into the shift, and 6 hours into shift<br>15-minute break length |
| Lunch Time | Duration and time of lunch | Lunch occurs halfway into the shift<br>30-minute lunch length |

Once the tour requirements and time interval have been set, the coefficient matrix A can be generated manually or by using an algorithm. The creation of the coefficient matrix A is a well-know process in the field of linear programming.

As a simple example, assume that the time interval is eight hours. Also assume that tours are weekly, include only shifts with the same start time and duration, and must give employees two consecutive days off. Finally, assume all shifts are eight hours and begin at 0:00, 9:00, and 17:00. The coefficient matrix A is then [21×21], meaning there are 21 total time intervals and 21 possible tours. An exemplary [21×10] portion of the matrix looks like:

$$\begin{array}{r}\text{Mon} \\ \\ \\ \text{Tues} \\ \\ \\ \text{Wed} \\ \\ \\ \text{Thurs} \\ \\ \\ \text{Fri} \\ \\ \\ \text{Sat} \\ \\ \\ \text{Sun} \\ \\ \\ \end{array}\begin{bmatrix}1 & 0 & 0 & 0 & 0 & 0 & 0 & 0 & 0 & 1 \\ 0 & 1 & 0 & 0 & 0 & 0 & 0 & 0 & 0 & 0 \\ 0 & 0 & 1 & 0 & 0 & 0 & 0 & 0 & 0 & 0 \\ 1 & 0 & 0 & 1 & 0 & 0 & 0 & 0 & 0 & 0 \\ 0 & 1 & 0 & 0 & 1 & 0 & 0 & 0 & 0 & 0 \\ 0 & 0 & 1 & 0 & 0 & 1 & 0 & 0 & 0 & 0 \\ 1 & 0 & 0 & 1 & 0 & 0 & 1 & 0 & 0 & 0 \\ 0 & 1 & 0 & 0 & 1 & 0 & 0 & 1 & 0 & 0 \\ 0 & 0 & 1 & 0 & 0 & 1 & 0 & 0 & 1 & 0 \\ 1 & 0 & 0 & 1 & 0 & 0 & 1 & 0 & 0 & 1 \\ 0 & 1 & 0 & 0 & 1 & 0 & 0 & 1 & 0 & 0 \\ 0 & 0 & 1 & 0 & 0 & 1 & 0 & 0 & 1 & 0 \\ 1 & 0 & 0 & 1 & 0 & 0 & 1 & 0 & 0 & 1 \\ 0 & 1 & 0 & 0 & 1 & 0 & 0 & 1 & 0 & 0 \\ 0 & 0 & 1 & 0 & 0 & 1 & 0 & 0 & 1 & 0 \\ 0 & 0 & 0 & 1 & 0 & 0 & 1 & 0 & 0 & 1 \\ 0 & 0 & 0 & 0 & 1 & 0 & 0 & 1 & 0 & 0 \\ 0 & 0 & 0 & 0 & 0 & 1 & 0 & 0 & 1 & 0 \\ 0 & 0 & 0 & 0 & 0 & 0 & 1 & 0 & 0 & 1 \\ 0 & 0 & 0 & 0 & 0 & 0 & 0 & 1 & 0 & 0 \\ 0 & 0 & 0 & 0 & 0 & 0 & 0 & 0 & 1 & 0 \end{bmatrix}$$

Looking at this exemplary coefficient matrix, each of the vertical columns represents a unique tour. Each tour consists of a single eight-hour shift worked on five consecutive days, and two consecutive days off.

The coefficient matrix A created in step 822 may be used to define various staffing conditions. For example, the coefficient matrix A may define tours for part-time workers. The coefficient matrix A may also define conditions of employment, such as mandatory breaks; for instance, an additional set of entries may be created for a "break station," and each employee may be required to spend a certain amount of time in the break station. Similarly, a maximum shift may be defined by subdividing shifts into intervals and preventing shifts that exceed a predefined sum of intervals.

In a simple example, the rows of the matrix indicate 8 hours of work by a person assigned to the tour. Each column represents a tour. A "1" placed in the appropriate row indicates that a worker is assigned to a particular associated 8 hour shift. If mandatory breaks or lunches must be included in the model then the definition of the row can be changed from 8 hour to 1 hour, 30 minutes or 15 minutes intervals. Again, as is the simple example, a value of "1" in a particular location represents that a worker associated with that location in the matrix is working during the interval associated with that location. In contrast, a "0" represents that the worker is not working during that period. To capture periods when workers are not working, such lunches (30 minutes) and breaks (15 minutes), rows must be defined as 15 minutes. Corresponding, additional rows are added to represent to increased number of periods. In the simple example, there are 21 rows (3 shifts per day times 7 days). By redefining the minimum time interval in the model to 15 minutes the new matrix would require 672 rows instead of 21 (3 shifts×8 hours×4 time intervals per hour×7 days). In the new matrix that includes lunches and breaks in addition to days off, values of "1" represent when workers are working and values of "0" now represent periods when workers are not working, either because the worker is on lunch, break or not scheduled. Typically, all combinations of tour possibilities are built into the matrix (more columns would be added to the simple example). The optimization calculation would then choose the set of tours that minimize the objective function.

In the same way, the coefficient matrix A may be used to explain how to define policy changes such as the use of part time employees, the allowing of full time employees to work non-traditional shifts (e.g., different from standard eight-hour shifts), the cross-training of baggage and passenger screeners, or the cross-training of supervisors to allow for scheduling down/up. The following policy changes may also be addressed through manipulations of the coefficient matrix A using known linear programming techniques:

Provide eight hour shifts/five days per week per full-time employee;
Provide two consecutive days off;
Use overtime intelligently (four 10 hour days/week);
Assure male/female ratio allows for same-sex wanding;
Provide 30 minute rotation through X-Ray machine;
Provide 30 minutes to screen a flight;
Allow one hour for daily breaks and lunch;
Consider employee constraints (medical, family, religious);
Allow screeners to rotate across checkpoints/concourses/baggage screening functions;
Rotate days off to assure all screeners have the opportunity at weekends off, vacation time;
Adapt workforce to accommodate seasonal differences in passenger flow;
Consider training constraints;
Incorporate "Fast-Pass" queuing; and
Consider employee qualifications for different jobs.

Note that policy changes related to scheduling are addressed through changes to the coefficient matrix A.

Returning to FIG. 8C, the tour assignment matrix is calculated in step 823 from the demand matrix b and the coefficient matrix A defined, respectively, in steps 821 and 822. The tour assignment matrix x indicates the integer number of workers assigned to each of the j tours. The solution will look something like:

$$\begin{bmatrix}0\\2\\5\\0\\0\\\cdot\\\cdot\\1\end{bmatrix}$$

In this example of the tour assignment matrix x, there are no workers scheduled for the first tour, two employees assigned to the second tour, five employees assigned to the third tour, and an employee assigned to the nth tour.

Typically, the coefficient matrix A and the demand matrix b may be programmed into a spreadsheet or mathematical calculation program that can automatically solve the linear program. The tour assignment matrix x is optimally determined. Specifically, the matrix x may be determined using shift optimization to minimize the total number of hours worked in a week and to create the optimal number of shifts required to operate stations (using a defined mix of full and part-time employees). It should be appreciated that the tour assignment x may not be unique in that several possible tour assignments may provide desirable results. In this way, a particular tour assignment x may not be the best but, rather, provides a feasible staffing schedule that meets the forecasted demand levels. Furthermore, there may be no possible solution to the tour assignment x, indicating the need to make changes to the checkpoint or the workforce (e.g., hiring additional workers).

If desired, the number of unique tours used in the solution can be limited by constraining the number of $x_j$ that are greater than zero. As described above, reducing the decision space expedites the linear programming calculations used to find a solution for an effective security schedule.

In another embodiment of the present invention, the coefficient matrix may be used to staff according to specific job skills and training. For instance, the coefficient matrix may be expanded to include limitations that require certain position to be filled only by certain employees. Alternatively, a separate coefficient matrix may be formed for each position, and the separate coefficient matrix includes variables limiting of potential security staffing combinations.

Execution

Returning to FIG. 3, after the schedule is defined in step 800, the schedule is implemented and studied in step 310. In particular, the performance measures, such as the average and maximum wait time for people passing through the checkpoint may be measured. The results of the scheduling can be studied and this data may be used to modify the demand data and to create an associated schedule, step 320. For instance, the assumptions used to forecast the required number of employees may be modified according to actual events.

In a preferred embodiment of the present invention, the demand data forecasted in step 400 is re-forecasted intermittently (such as biweekly, monthly or quarterly) because airport usage, and thus demand, typically varies over an extended period. Then the effective staffing defined in step in 800 is revised to reflect the seasonal changes in the demand data.

System

Figure 9:
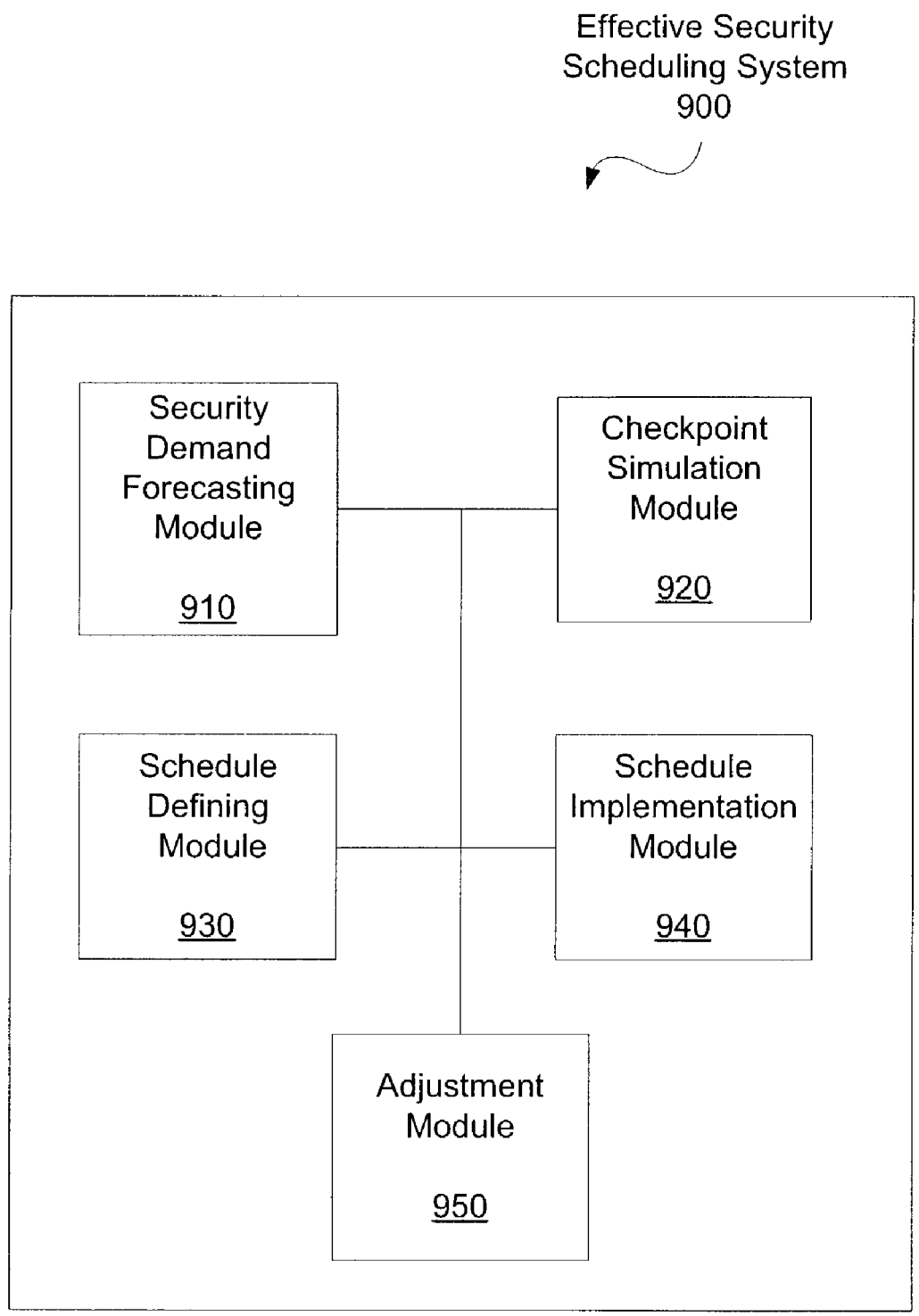
FIG. 9 is a schematic diagram of a system for implementing the method of FIG. 3 in accordance with embodiments of the present invention.

Referring now to FIG. 9, another embodiment of the present invention provides an effective security scheduling system 900. As depicted in FIG. 9, the effective security scheduling system 900 generally includes separate modules that are interconnected to implement the steps in the effective security scheduling method 300. Specifically, the effective security scheduling system 900 includes a security demand forecasting module 910. The security demand forecasting modeling module 910 accepts input data related to the facility. For instance, security demand at an airport may be forecasted using flight schedules, flight capacity data, and predetermined demand distribution curves, as described above.

The effective security scheduling system 900 may further include a checkpoint simulation module 920 using security checkpoint data and the security demand, as described above in FIGS. 4C and 4D and the associated text. The checkpoint simulation module 920 forecasts the number of security workers to be staffed at various times. A simulation may be performed using a commercially available process simulation software, such as Arena® marketed by Rockwell Software of Sewickley, Pa. Alternatively, the security checkpoint data and the security checkpoint demand may be used by a simulation program created using known programming techniques and known computer languages such as JAVA, Simscript, SLAMII, Extend, Promodel, etc.

Continuing with FIG. 9, a schedule defining module 930 uses user-defined inputs and the outputs from the demand forecasting module 910 and the checkpoint simulation module 920 to create a security work schedule. As described above in FIG. 8B and the associated text, the user-defined inputs generally include data related to the number security workers and the condition of work for these workers. This type of information includes the shift length, possible starting and end times, shift frequency, breaks, etc. associated with each of the workers. Furthermore, the user-defined inputs may include constraints limiting potential staffing configurations, such as limiting the staffing of certain positions to workers with sufficient employees.

The schedule defining module 930 is typically some type of computer application that automatically creates an optimized work schedule using various optimization techniques. For instance, the schedule defining module 930 may solve the linear system described above associated with Equation 1. Many commercial spreadsheet applications, such as Excel® produced by Microsoft, Inc. of Redmond, Wash., have optional add-on applications that can be used to perform these types of optimizations. For instance, Frontline Systems, Inc. of Incline Village, Nev. markets a spreadsheet solver application under the name Premium Solver that works with a spreadsheet application to quickly solve large optimization problems.

Furthermore, the commercial spreadsheet applications may be programmed to automatically accept user-defined inputs from a database and the security demand modeling data from the security demand forecasting module 910 and the checkpoint simulation module 920. The commercial spreadsheet applications can then be configured to automatically create the matrix of interest, as described in Equation 1, and solve these systems of the equations. Alternatively, other software, including as mathematical computational application such Mathematica Wolfram Research, Inc. of Champaign, Ill. may automatically solve matrices manually created by a user from the input data and the security demand modeling data.

Continuing with FIG. 9, after the schedule is created by the schedule defining module 930, a schedule implementation module 940 may optionally provide the schedule to the security workers using known means. For instance, the schedule implementation module 940 may electronically present the schedule to the security workers. The schedule implementation module 940 may further track the activities of workers to ensure adherence with the schedule. For instance, the schedule implementation module 940 may record the actual start and end times for workers, along with any break times in between. This may be automatically accomplished by requiring workers to electronically register when entering or leaving the security checkpoint.

Returning to FIG. 9, the adjustment module 950 collects data regarding the operation of the security checkpoint and uses this data to adjust the operations of the other modules in the effective security scheduling system 900. For instance, the adjustment module 950 may alter the assumptions used by the security demand modeling module if proper implementation of the schedule has undesirable effects, such as excessive wait times. Similarly, the adjustment module 950 may suggest changes in the operation of the schedule defining module 930, such as the hiring of additional workers or additional types of workers, as needed to produce more effective schedules in view of the security demand model. In the same way, changes may be made to the schedule implementation module 940 where workers are not complying with the schedule created by the schedule defining module 930.

The adjustment module 950 may also be used by management and employees to adjust the schedule as needed. For example, the adjustment module 950 may accept feedback from workers to adjust the schedule, such as requests for vacation days or requests for schedule changes. Similarly, management may add additional requirements, such as additional administrative time for the employees. For instance, the workers may be required to attend training or administrative meetings. The effective security scheduling system 900 may then schedule these administrative tasks during periods of excess labor capacity, when the checkpoint can spare the loss of some workers without adverse effect to the performance measures.

Extended Planning

In another embodiment, the ESS method 300 and the system 900 may be used to forecast security staffing needs over an extended period and to staff security personnel accordingly. Often, locations have security screening demand that varies over an extended period, such as over different months, seasons or years. Thus, the number of needed security personnel for an efficient schedule, as described above, may similarly vary over the extended period as needed to meet the change in demand. For example, FIG. 10 depicts an extended needed worker graph 1000 that represents a location that needs more security workers over the summer.

The changes in the needed number of workers over an extended period may be predicted through forecasting the needed number of security stations in step 400 and defining an effective schedule in step 800, both over the extended period of interest. For instance, needed number of security stations at an airport may be forecasted over an extended period to form the extended needed worker graph 1000 by examining the number of flights departing from the airport, the load factors for these flights, etc. as described above in FIG. 4B and the associated text.

In general, the extended forecast is performed at prespecified intervals. For example, a security checkpoint may be modeled and an optimized schedule formed once, every three months to determine seasonal changes in demand and resulting changes to staffing needs.

Security checkpoint management may then match seasonal demand fluctuations using hiring lead times and managed attrition to enable staffing over an extended period as needed to meet desired service levels. For instance, referring back to the extended needed worker graph 1000 in FIG. 10, the employees need to be hired and trained prior to the peak summer period. Similarly, by forecasting the decrease in security screening demand that occurs after the summer season, management may appropriately cease hiring and allow the staff size to decrease as needed through natural attrition.

By staffing over an extended period, the present invention may reduce costs associated with hiring new personnel. For instance, an extended staffing schedule may include an integrated training plan that reduces the number of training sessions required. Likewise, staffing over an extended period may reduce procurement cost through increased employer bargaining power gained through an integrated supply plan. As a result, the present invention allows managers to analyze policy change impacts prior to and during a budget process and to proactively build response to budgetary impacts into a strategic plan.

When forecasting and staffing over an extended period, such as the extended needed worker graph 1000, various planning assumptions and factors may be used. For instance, the forecast may include data related to industry growth trends, individual checkpoints, and other factors. Likewise, staffing over an extended period may consider historic demand patterns, historic staffing requirements, and individual checkpoint characteristics. The extended forecasts and staffing may further implement policies that may not effect short-term staffing, including security directives, staffing rules, and policy changes.

Without the present invention, security staffing and hiring are currently reactionary (i.e., ad hoc) in that management responds to high demand and long delays (or other undesirable service measures) by hiring additional workers. However, hiring new workers is often not effective in the short-run to address high demand. Hiring is a potentially extended process. Furthermore, new employees must be adequately trained, further stressing the existing supply of labor resources. The hiring and training of new employees is also a potentially expensive process if the management must compete with other employers for scarce employees during peak periods.

In response, the managers may use the present invention to create policies for cost effective mixes of full time, part time, and term employees. Using part time and term employees to augment full-time employees is generally an effective approach to manage seasonal peaks efficiently. By forecasting demand over an extended period, managers of a security checkpoint may hire and train the part time and term employees before the peak periods in order to reduce the duration of overcapacity periods. An employee mix may be used to decrease the traditional time required to meet seasonal peaks. Likewise, an employee mix may be used to decrease the time required to return to baseline workforce. By anticipating the peak demand periods, management may identify labor pools that are readily available on part time or term basis. Alternatively, demand peaks may be addressed through the creation of regional workforce teams with the capability to move between different security checkpoint locations based on demand. Furthermore, the managers may allocate assets (i.e., the machinery used in the checkpoint) based on the characteristics of the asset and field requirements.

Thus, it can be seen that the present invention enables a labor planning process to determine resource levels required for the upcoming time frame based on demand forecasting methodology and effective scheduling. Management may then determine resources required to meet service levels. Consequently, the present invention allows management to understand the impacts of resource allocation prior to the beginning of budget cycles.

Policy Analysis

As described above in FIG. 4A and the accompanying text, policy changes to the security checkpoint may be reliably simulated by modifying the model of the security checkpoint. The modified model may then be used to determine changes in the number of workers needed to achieve acceptable performance measures. A new optimized schedule may be formed for this new number of workers. The cost of the policy changes is then the additional costs from the new optimized schedule, in comparison to an existing schedule. For instance, this type of policy analysis may predict the change labor costs associated with new machine or additional step in the checkpoint.

In contrast, a change in staffing policy may be evaluated by changing the constraints used to form an optimized schedule, as described in FIG. 8A and the accompanying text. Referring to the linear programming method described above, the coefficient matrix A may be modified to reflect new staffing policies that place additional requirements on schedule creation.

CONCLUSION

Figure 2C:
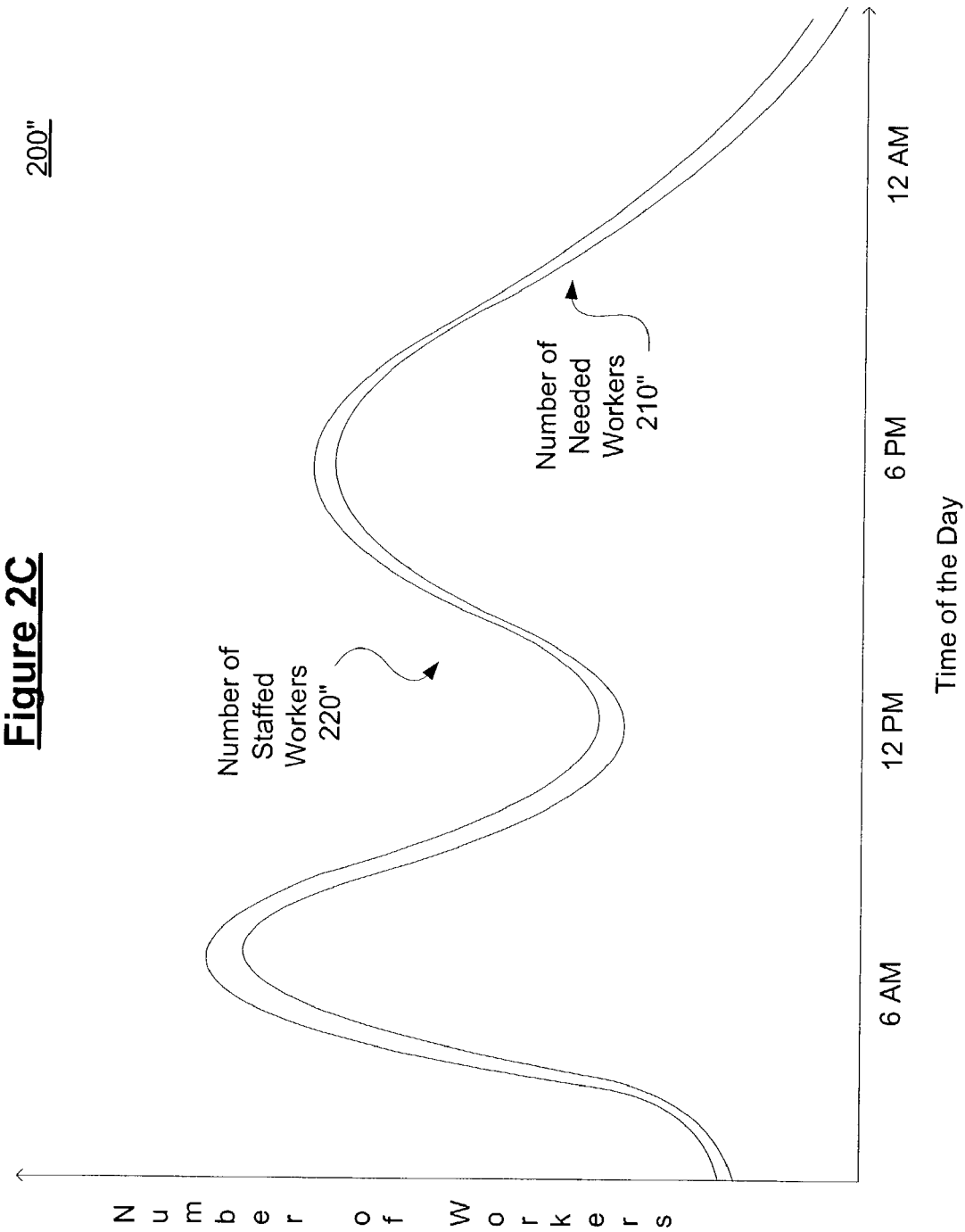

A schedule created by the present invention results in great savings in labor costs and ensuring that desired service levels are met. As depicted in FIG. 2C, an optimized scheduling chart 200" illustrates how an effective work schedule staffs the security checkpoint as needed to meet demand at the checkpoint to reduce inefficient labor allocation and unnecessary labor costs. In comparison to the scheduling charts 200 and 200', depicted in FIGS. 2A and 2B respectively, the optimized scheduling chart 200" of FIG. 2C graphically depicts how varying the staffing at the security checkpoint in accordance with demand at the checkpoint results in much less overstaffing. In particular, there is much less difference between the number of required employees line 210", and the number of employees working line 220". Moreover, the number of employees generally meets or exceeds the staffing levels needed to accommodate the instantaneous demand for security. Accordingly, the optimized work schedule, as embodied by chart 200" depicts improvements in efficiency produced by the present invention.

As described above, the number of needed workers represents the workforce needed to satisfy various performance measures. In this way, the forecasted demand for security screening may exceed capacity of the staffed number of workers, but the effects of the excess demand should still fall within the desired performance measures (e.g., a delay may result, but the expected delay should be less than a predefined limit, as estimated in modeling during step 420). Likewise, as described above, the number of needed workers also considers time needed for various administrative tasks, including training, supervision, job reviews, etc. In this way, the security checkpoint should be adequately staffed as needed to achieve the performance measures, even if the some of the employees are required to participate in administrative tasks.

Thus, the present invention may be used to achieve numerous desired results, including lower total personnel costs; reduced numbers of full-time employees (FTE); greater diversity in the workforce (through the use of part-time or seasonal employees); improved cost effectiveness while at least maintaining the customer service level; the creation of consistency in staffing and scheduling; the development of rule-driven, repeatable schedules; maximizing employee morale; reducing costs associated with scheduling; reducing the costs of creating and maintaining schedule; better support of security efforts and operation of the Federal Security Director; iteration to address problems as required; and sufficient flexibility to respond to potential policy changes.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for generating a schedule for security workers, comprising:
   receiving a performance measure as an input to a computer;
   forecasting, by the computer, a demand for a security checkpoint for a site for a plurality of time intervals, wherein forecasting the demand comprises:
      determining a preliminary demand for the security checkpoint based on a total number of users of the site; and
      adjusting the preliminary demand to determine actual forecasted demand for the security checkpoint based on a reduction in demand caused by users expected to use the site without passing through the checkpoint;
   modeling, by the computer, to forecast a needed number of stations in the security checkpoint for the time intervals to meet the forecasted demand and to achieve the performance measure,
      wherein the stations are each associated with at least one task; and wherein the modeling comprises:
         estimating an impact of modifying a first number of stations on achieving the performance measure, and
         selecting, by the computer and based on the estimated impact, the needed number of stations for each of the time intervals to meet the forecasted demand and to achieve the performance measure; and
   scheduling, by the computer, a number of workers for staffing the selected number of stations for each of the time intervals, wherein the scheduling further comprises:
      defining, by the computer, a preliminary number of workers for staffing the selected number of stations for each of the time intervals based on a first staff-to-station relationship between the workers and stations in the selected number of stations, and
      adjusting the preliminary number of workers to reflect a second and different staff-to-station relationship between the workers and two or more of the stations due to related tasks at the two or more of the stations.

2. The computer-implemented method of claim 1, wherein the second and different staff-to-station relationship arises due to an effect of performance of activities at one of the stations on performance of activities at another one of the stations.

3. The computer-implemented method of claim 1,
   wherein adjusting the preliminary number of workers comprises creating an effective schedule,
   further comprising modifying the scheduled number of workers in the effective schedule based on results of implementing the effective schedule.

4. The computer-implemented method of claim 1, wherein the first staff-to-station relationship comprises a first linear relationship.

5. The computer-implemented method of claim 4, wherein the second and different staff-to-station relationship comprises a second linear relationship.

6. The computer-implemented method of claim 1, wherein the modeling comprises:
   separately modeling two or more different tasks of one of the stations at the time intervals, and
   selecting, by the computer and based on results from the separate modelings, a number of stations for each of the time intervals needed to meet the forecasted demand and to achieve the performance measure.

7. The computer-implemented method of claim 6, wherein separately modeling the two or more different tasks comprises matching up worker resources to activities in the one of the stations.

8. The computer-implemented method of claim 7, wherein modeling further comprises modifying sub-tasks in one of the two or more different tasks.

9. The computer-implemented method of claim 1, wherein the modeling comprises:
   estimating the effect of policy changes on performance of two or more different tasks at the time intervals, and selecting, by the computer, the number of stations for the time intervals based on the estimated effect of the policy changes.

10. The computer-implemented method of claim 1, wherein the modeling comprises:
estimating an impact of modifying tasks of a first station for each of the time intervals, and
selecting, by the computer, the number of stations for each of the time intervals based on the estimated impact of the modified tasks.

11. The computer-implemented method of claim 7, wherein modeling further comprises including an additional task for the one of the stations.

12. The computer-implemented method of claim 1, wherein the performance measure is a maximum amount of time that a person or item takes to pass through the security checkpoint.

13. The computer-implemented method of claim 1,
wherein the preliminary demand is based on one or more flights from an airport,
wherein determining the preliminary demand comprises determining a total possible number of passengers on each of the flights, and
wherein adjusting the preliminary demand comprises:
forecasting an actual number of passengers on a first flight by reducing a total possible number of passengers on the first flight by a load factor for the first flight;
forecasting an actual number of passengers on the first flight expected to pass through the security checkpoint by reducing the actual number of passengers on the first flight by a number of passengers on the first flight transferring from other flights;
determining a security demand distribution for the first flight over each of the time intervals; and
summing security demand distributions for all of the flights over each of the time intervals.

14. The computer-implemented method of claim 1,
wherein scheduling the number of workers comprises defining an availability of selected workers at the each of the time intervals; and
wherein defining the availability of the selected workers comprises:
defining one or more tours extending over one or more of the time intervals; and
defining each of the selected workers' availability for each of the tours.

15. The computer-implemented method of claim 14, wherein defining the availability of the selected workers comprises defining acceptable ranges for shift lengths and a maximum number of start times.

16. The computer-implemented method of claim 14, wherein scheduling the selected number of workers further comprises:
forming a demand matrix representing a needed number of workers at each of the time intervals;
forming a coefficient matrix representing an availability of the selected workers at each of the time intervals; and
calculating a tour assignment matrix from the demand and coefficient matrices, the values of said tour assignment matrix defining the schedule for the security workers for each of the time intervals.

17. The computer-implemented method of claim 16 wherein the tour assignment matrix is calculated using a method selected from the group consisting of: linear programming, quadratic or mixed-integer programming, nonlinear optimization, global optimization, non-smooth optimization using genetic and evolutionary algorithms, and constraint programming methods from artificial intelligence.

18. The computer-implemented method of claim 1, further comprising determining a number of workers needed during each of the time intervals to perform administrative tasks.

19. The computer-implemented method of claim 1, wherein the plurality of time intervals comprises a first period of time intervals and the schedule comprises a first schedule for the first period; and further comprising:
generating a second schedule over a second period of time intervals,
forecasting a second demand for the security checkpoint over the second period;
determining a second number of workers to meet the forecasted second demand during each of the time intervals in the second period;
scheduling at least said second needed number of workers to each of the time intervals of the second period to generate a second schedule.

20. The computer-implemented method of claim 19, further comprising:
calculating a cost associated with the first schedule;
calculating a cost associated with the second schedule; and
comparing the costs associated with the first and second schedules.

21. The computer-implemented method of claim 1, wherein the number of workers is a first number of workers, and further comprising:
calculating a cost associated with the schedule for the first number of workers;
for a modified security checkpoint, determining a second number of workers during each of the time intervals to meet the forecasted demand for the security checkpoint;
scheduling at least the second number of workers to each of the time intervals;
calculating a cost associated with the schedule for the second number of workers, and
comparing the costs associated with the schedules for the first and second number of workers.

22. The computer-implemented method of claim 21, wherein determining the second number of workers further comprises modeling the modified security checkpoint at each of the time intervals in view of the forecasted demand.

23. A system for generating a schedule for security workers, comprising:
a processor;
a non-transitory computer-readable medium encoding instructions for automated formation of a schedule for security workers, comprising modules encoding interrelated and interdependent processes for execution by the processor, including:
a demand forecast module configured to forecast a demand at a security checkpoint for a site for a plurality of time intervals, wherein the demand forecast module is further configured to:
determine a preliminary demand for the security checkpoint based on a total number of users of the site; and
adjust the preliminary demand to determine actual forecasted demand for the security checkpoint based on a reduction in demand caused by users expected to use the site without passing through the checkpoint;
a needed stations determination module configured to model to forecast a needed number of stations in the security checkpoint for the time intervals to meet the forecasted demand, wherein the stations are each associated with at least one task; and wherein the needed stations determination module is configured to:

estimate an impact of modifying a first number of stations on achieving the performance measure, and select, based on the estimated impact, the needed number of stations for each of the time intervals to meet the forecasted demand and to achieve the performance measure; and a scheduling module configured to form the schedule of a number of workers for staffing the selected number of stations for each of the time intervals, wherein the scheduling module is further configured to:

define, by the processor, a preliminary number of workers for staffing the selected number of stations for each of the time intervals based on a first staff-to-station relationship between the workers and stations in the selected number of stations, and adjust the preliminary number of workers to reflect a second and different staff-to-station relationship between the workers and two or more of the stations due to related tasks at the two or more of the stations.

24. The system of claim 23, wherein the second and different staff-to-station staffing relationship arises due to an effect of performance of activities at one of the stations on performance of activities at another one of the stations.

25. The system of claim 23, wherein the scheduling module is further configured to create an effective schedule based on the adjusting of the preliminary number of workers, and wherein the system further comprises an schedule modifying module configured to modify the scheduled number of workers in the effective schedule based on results of implementing the effective schedule.

26. The system of claim 23, wherein the first staff-to-station relationship comprises a first linear relationship.

27. The system of claim 26, wherein the second and different staff-to-station relationship comprises a second linear relationship.

28. A computer program embodied on a non-transitory computer readable medium for automated formation of a schedule for security workers, said program comprising modules encoding interrelated and interdependent processes, including a demand forecast module, a needed stations determination module, and a scheduling module, wherein the computer program is configured to perform a method comprising:

receiving a performance measure as an input to a computer;

forecasting, by the demand forecast module, a demand for a security checkpoint for a site for a plurality of time intervals, wherein forecasting the demand comprises:

determining a preliminary demand for the security checkpoint based on a total number of users of the site; and adjusting the preliminary demand to determine actual forecasted demand for the security checkpoint based on a reduction in demand caused by users expected to use the site without passing through the checkpoint;

modeling, by the needed stations determination module, to forecast a needed number of stations in the security checkpoint for the time intervals to meet the forecasted demand, wherein the stations are each associated with at least one task; and wherein the modeling comprises:

estimating an impact of modifying a first number of stations on achieving the performance measure, and selecting, by the computer and based on the estimated impact, the needed number of stations for each of the time intervals to meet the forecasted demand and to achieve the performance measure; and scheduling, by the scheduling module, a number of workers for staffing the selected number of stations for each of the time intervals, wherein the scheduling further comprises:

defining, by the computer, a preliminary number of workers for staffing the selected number of stations for each of the time intervals based on a first staff-to-station relationship between the workers and stations in the selected number of stations, and adjusting the preliminary number of workers to reflect a second and different staff-to-station relationship between the workers and two or more of the stations due to related tasks at the two or more of the stations.

29. The computer program of claim 28, wherein the second and different staff-to-station relationship arises due to an effect of performance of activities at one of the stations on performance of activities at another one of the stations.

30. The computer program of claim 28, wherein adjusting the preliminary number of workers comprises creating an effective schedule, and wherein the method further comprises modifying the scheduled number of workers in the effective schedule based on results of implementing the effective schedule.

31. The computer program of claim 28, wherein the first staff-to-station relationship comprises a first linear relationship.

32. The computer program of claim 31, wherein the second and different staff-to-station relationship comprises a second linear relationship.

33. A computer-implemented method for generating a schedule for security workers, comprising:

receiving a performance measure as an input to a computer;

forecasting, by the computer, a demand for a security checkpoint for a site for a plurality of time intervals, wherein forecasting the demand comprises:

determining a preliminary demand for the security checkpoint based on a total number of users of the site; and adjusting the preliminary demand to determine an actual forecasted demand for the security checkpoint based on a reduction in demand caused by users expected to use the site without passing through the checkpoint;

modeling, by the computer, to forecast a needed number of stations in the security checkpoint for the time intervals to meet the actual forecasted demand and to achieve the performance measure; and scheduling, by the computer, a number of workers for staffing the selected number of stations for each of the time intervals, wherein the scheduling further comprises:

defining, by the computer, a preliminary number of workers for staffing the selected number of stations for each of the time intervals based on a first staff-to-station relationship between the workers and stations in the selected number of stations, and adjusting the preliminary number of workers to reflect a second and different staff-to-station relationship between the workers and two or more of the stations due to related tasks at the two or more of the stations.

34. The computer-implemented method of claim 33,
wherein the site comprises an airport;
wherein the total number of users of the site comprises a total number of passengers on flights scheduled to arrive and depart at the airport; and
wherein adjusting the preliminary demand comprises reducing the preliminary demand by passengers transferring from arriving flights to departing flights.

35. The computer-implemented method of claim 33,
wherein the preliminary demand is based on one or more flights from an airport,
wherein determining the preliminary demand comprises determining a total possible number of passengers on each of the flights, and
wherein adjusting the preliminary demand comprises:
  forecasting an actual number of passengers on a first flight by reducing a total possible number of passengers on the first flight by a load factor for the first flight;
  forecasting an actual number of passengers on the first flight expected to pass through the security checkpoint by reducing the actual number of passengers on the first flight by a number of passengers on the first flight transferring from other flights;
  determining a security demand distribution for the first flight over each of the time intervals; and
  summing security demand distributions for all of the flights over each of the time intervals.

36. A computer-implemented method for generating a schedule for security workers, comprising:
receiving a performance measure as an input to a computer;
forecasting, by the computer, a demand for a security checkpoint for a plurality of time intervals, wherein forecasting the demand for the security checkpoint comprises:
  determining a preliminary demand for the security checkpoint based on a total number of users of the site and on one or more flights from an airport, wherein determining the preliminary demand comprises determining a total possible number of passengers on each of the flights; and
  adjusting the preliminary demand to determine actual forecasted demand for the security checkpoint based on a reduction in demand caused by users expected to use the site without passing through the checkpoint, wherein adjusting the preliminary demand comprises:
    forecasting an actual number of passengers on a first flight by reducing a total possible number of passengers on the first flight by a load factor for the first flight;
    forecasting an actual number of passengers on the first flight expected to pass through the security checkpoint by reducing the actual number of passengers on the first flight by a number of passengers on the first flight transferring from other flights;
    determining a security demand distribution for the first flight over each of the time intervals; and
    summing security demand distributions for all of the flights over each of the time intervals;
modeling, by the computer, to forecast a needed number of stations in the security checkpoint for the time intervals to meet the forecasted demand and to achieve the performance measure,
  wherein the stations are each associated with at least one task; and
  wherein the modeling comprises:
    estimating an impact of modifying a first number of stations on achieving the performance measure, and
    selecting, by the computer and based on the estimated impact, the needed number of stations for each of the time intervals to meet the forecasted demand and to achieve the performance measure; and
scheduling, by the computer, a number of workers for staffing the selected number of stations for each of the time intervals, wherein the scheduling further comprises:
  defining, by the computer, a preliminary number of workers for staffing the selected number of stations for each of the time intervals based on a first staff-to-station relationship between the workers and stations in the selected number of stations, and
  adjusting the preliminary number of workers to reflect a second and different staff-to-station relationship between the workers and two or more of the stations due to related tasks at the two or more of the stations.

37. A system for generating a schedule for security workers, comprising:
a processor;
a non-transitory computer-readable medium encoding instructions for automated formation of a schedule for security workers, comprising modules encoding interrelated and interdependent processes for execution by the processor, including:
  a demand forecast module configured to forecast a demand at a security checkpoint for a plurality of time intervals, wherein the demand forecast module is configured to forecast the demand by:
    determining a preliminary demand for the security checkpoint based on a total number of users of the site and on one or more flights from an airport, wherein determining the preliminary demand comprises determining a total possible number of passengers on each of the flights; and
    adjusting the preliminary demand to determine actual forecasted demand for the security checkpoint based on a reduction in demand caused by users expected to use the site without passing through the checkpoint, wherein adjusting the preliminary demand comprises:
      forecasting an actual number of passengers on a first flight by reducing a total possible number of passengers on the first flight by a load factor for the first flight;
      forecasting an actual number of passengers on the first flight expected to pass through the security checkpoint by reducing the actual number of passengers on the first flight by a number of passengers on the first flight transferring from other flights;
      determining a security demand distribution for the first flight over each of the time intervals; and
      summing security demand distributions for all of the flights over each of the time intervals;

a needed stations determination module configured to model to forecast a needed number of stations in the security checkpoint for the time intervals to meet the forecasted demand,
  wherein the stations are each associated with at least one task; and
  wherein the needed stations determination module is configured to:
    estimate an impact of modifying a first number of stations on achieving the performance measure, and
    select, based on the estimated impact, the needed number of stations for each of the time intervals to meet the forecasted demand and to achieve the performance measure; and
a scheduling module configured to form the schedule of a number of workers for staffing the selected number of stations for each of the time intervals, wherein the scheduling module is further configured to:
  define, by the processor, a preliminary number of workers for staffing the selected number of stations for each of the time intervals based on a first staff-to-station relationship between the workers and stations in the selected number of stations, and
  adjust the preliminary number of workers to reflect a second and different staff-to-station relationship between the workers and two or more of the stations due to related tasks at the two or more of the stations.

38. A computer program embodied on a non-transitory computer readable medium for automated formation of a schedule for security workers, said program comprising modules encoding interrelated and interdependent processes, including a demand forecast module, a needed stations determination module, and a scheduling module,
  wherein the computer program is configured to perform a method comprising:
    receiving a performance measure as an input to a computer;
    forecasting, by the computer, a demand for a security checkpoint for a plurality of time intervals, wherein forecasting the demand for the security checkpoint comprises:
      determining a preliminary demand for the security checkpoint based on a total number of users of the site and on one or more flights from an airport, wherein determining the preliminary demand comprises determining a total possible number of passengers on each of the flights; and
    adjusting the preliminary demand to determine actual forecasted demand for the security checkpoint based on a reduction in demand caused by users expected to use the site without passing through the checkpoint, wherein adjusting the preliminary demand comprises:
      forecasting an actual number of passengers on a first flight by reducing a total possible number of passengers on the first flight by a load factor for the first flight;
      forecasting an actual number of passengers on the first flight expected to pass through the security checkpoint by reducing the actual number of passengers on the first flight by a number of passengers on the first flight transferring from other flights;
      determining a security demand distribution for the first flight over each of the time intervals; and
      summing security demand distributions for all of the flights over each of the time intervals;
    modeling, by the computer, to forecast a needed number of stations in the security checkpoint for the time intervals to meet the forecasted demand and to achieve the performance measure,
      wherein the stations are each associated with at least one task; and
      wherein the modeling comprises:
        estimating an impact of modifying a first number of stations on achieving the performance measure, and
        selecting, by the computer and based on the estimated impact, the needed number of stations for each of the time intervals to meet the forecasted demand and to achieve the performance measure; and
    scheduling, by the computer, a number of workers for staffing the selected number of stations for each of the time intervals, wherein the scheduling further comprises:
      defining, by the computer, a preliminary number of workers for staffing the selected number of stations for each of the time intervals based on a first staff-to-station relationship between the workers and stations in the selected number of stations, and
      adjusting the preliminary number of workers to reflect a second and different staff-to-station relationship between the workers and two or more of the stations due to related tasks at the two or more of the stations.

* * * * *

UNITED STATES PATENT AND TRADEMARK OFFICE
CERTIFICATE OF CORRECTION

PATENT NO. : 7,840,435 B2  
APPLICATION NO. : 10/400441  
DATED : November 23, 2010  
INVENTOR(S) : Craig Robertson et al.

Page 1 of 1

It is certified that error appears in the above-identified patent and that said Letters Patent is hereby corrected as shown below:

On the Title Page, Item (73), in the Assignee, line 2, "Schafehausen (CH)" should read --Schaffhausen (CH)--.

In claim 24, column 23, line 26, after "staff-to-station", delete "staffing".

In claim 25, column 23, line 33, "an schedule" should read --a schedule--.

Signed and Sealed this  
First Day of March, 2011

David J. Kappos  
*Director of the United States Patent and Trademark Office*